US009071409B2

(12) United States Patent
Hashida

(10) Patent No.: US 9,071,409 B2
(45) Date of Patent: Jun. 30, 2015

(54) INTERPOLATION CIRCUIT AND RECEIVING CIRCUIT

(71) Applicant: FUJITSU LIMITED, Kawasaki-shi (JP)

(72) Inventor: Takushi Hashida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 292 days.

(21) Appl. No.: 13/685,136

(22) Filed: Nov. 26, 2012

(65) Prior Publication Data
US 2013/0243128 A1 Sep. 19, 2013

(30) Foreign Application Priority Data

Mar. 13, 2012 (JP) .................................. 2012-056381

(51) Int. Cl.
H04L 7/00 (2006.01)

(52) U.S. Cl.
CPC ............. *H04L 7/0087* (2013.01); *H04L 7/0029* (2013.01)

(58) Field of Classification Search
CPC ........... G06G 7/14; G06G 7/1928; G06J 1/00; G06N 3/0635; G06N 3/063; G06E 3/005; H03H 15/00; H03H 15/02; H03H 19/004; H03H 11/04

USPC .................................................. 708/801, 819
See application file for complete search history.

(56) References Cited

U.S. PATENT DOCUMENTS 3,831,016 A * 8/1974 Nathan .............................. 708/8
5,479,450 A 12/1995 Okanoue et al.
6,700,521 B2 * 3/2004 Koyanagi ...................... 708/819

FOREIGN PATENT DOCUMENTS

JP 06-197083 7/1994
JP 2002-111749 4/2002

* cited by examiner

Primary Examiner — Tan V. Mai
(74) Attorney, Agent, or Firm — Fujitsu Patent Center

(57) ABSTRACT

An interpolation circuit includes: a first circuit that generates first interpolation data from a plurality of pieces of data among data inputted in time series; a second circuit that generates second interpolation data from the plurality of pieces of data in timing when a part of the data inputted in time series in the first circuit lacks; and a third circuit that adds the second interpolation data to a location in the first interpolation data where the part of the data inputted in time series has lacked.

13 Claims, 22 Drawing Sheets

INTERPOLATION CIRCUIT AND RECEIVING CIRCUIT

CROSS-REFERENCE TO RELATED APPLICATION

This application is based upon and claims the benefit of priority of the prior Japanese Patent Application No. 2012-056381, filed on Mar. 13, 2012, the entire contents of which are incorporated herein by reference.

FIELD

A certain aspect of the embodiments discussed herein is related to an interpolation circuit and a receiving circuit.

BACKGROUND

As the performance of an information processing device, such as a device for communication base and a server, improves, the data rate of transmission and reception of signals inside and outside such a device is increasing. In a receiving circuit of such a transmission and reception device, there are a synchronous receiving circuit that samples input data in synchronization with the phase of the input data, and an asynchronous receiving circuit that samples input data without synchronizing with the phase of the input data. The asynchronous receiving circuit generates receive data from the sampled data by interpolation.

There has been known a technique in which a receiver for transmitting interactive signals has a replica driver (see Japanese Laid-Open Patent Publication No. 2002-111749). There has been known a technique that selects received signal series sampled in the correct sampling timing from a signal in which the distortion by intersymbol interference has occurred (see Japanese Laid-Open Patent Publication No. 06-197083).

SUMMARY

According to an aspect of the present invention, there is provided a base station apparatus that wirelessly communicates with a wireless terminal, including: a determination portion that determines a mode of the wireless terminal that exists in a service area of the base station apparatus; and a setting portion that sets a first mode in which a first period in which the base station apparatus is communicable with the wireless terminal and a second period in which the base station apparatus is in communicable with the wireless terminal are provided alternately, based on a result of the determination of the determination portion, and sets a length of the second period based on the result of the determination of the determination portion.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A description will be given of embodiments of the invention, with reference to drawings.

Figure 1A:
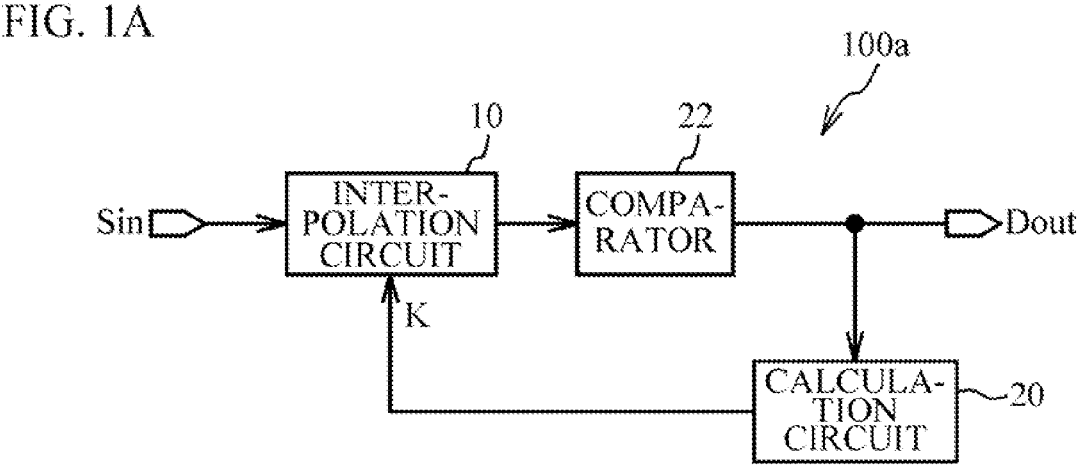
FIG. 1A is a block diagram of a receiving circuit according to a comparative embodiment.
Figure 1B:
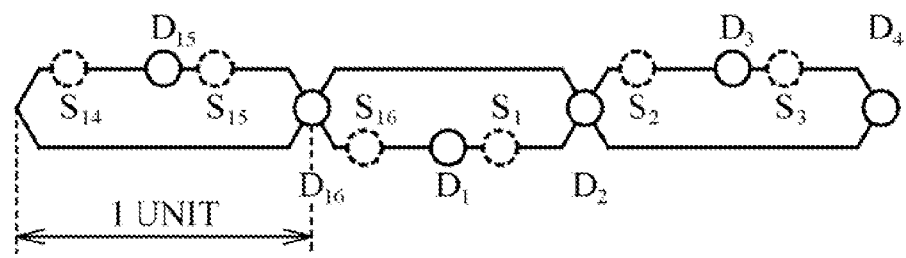
FIG. 1B is a diagram illustrating a sampling method.

(EMBODIMENT 1) First, a description will be given of an asynchronous receiving circuit. FIG. 1A is a block diagram of a receiving circuit according to a comparative embodiment. FIG. 1B is a diagram illustrating a sampling method. As illustrated in FIG. 1A, a receiving circuit 100a includes an interpolation circuit 10, a calculation circuit 20 and a comparator 22. The interpolation circuit 10 generates interpolation data from input data Sin using an interpolation coefficient k. The comparator 22 generates receive data by comparing the interpolation data with a reference value. The calculation circuit 20 detects phase information from the receive data, and calculates an interpolation code as the interpolation coefficient k. For example, a CDR (Clock Data Recovery) circuit can be used as the calculation circuit 20.

FIG. 1B illustrates signals with respect to time. In the comparative embodiment and the following embodiments, a 2× system in which two pieces of data per one unit are sampled is explained as an example, but the comparative embodiment and the following embodiments are applicable to other systems. Codes "Sn" in FIG. 1B correspond to the input data inputted in the time series. The interpolation circuit 10 generates a piece of interpolation data Dn from two pieces of input data Sn−1 and Sn. When the interpolation coefficient k is set as 0≤k≤1, the interpolation data Dn can be generated depending on a formula "Dn=(1−k)×Sn−1+k×Sn". Thereby, the interpolation data which corresponds with the phase of the input data can be generated. Thus, the interpolation coefficient k is a coefficient for weighting of the input data.

Next, a description will be given of a problem of the asynchronous receiving circuit. In the asynchronous receiving circuit, a frequency $f_{data}$ of the input data and a sampling frequency $f_{sample}$ may differ from each other. When the frequency $f_{data}$ is more than the frequency $f_{sample}$, there is timing that the interpolation coefficient k is changed from 0 to 1. When the frequency $f_{data}$ is less than the frequency $f_{sample}$, there is timing that the interpolation coefficient k is changed from 1 to 0.

Figure 2A:
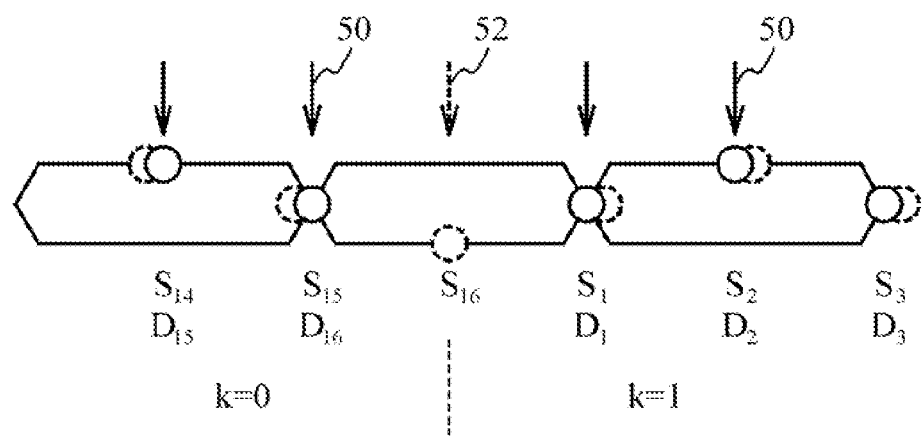
FIG. 2A is a diagram illustrating a signal with respect to a time in timing when an interpolation coefficient k is changed from 0 to 1.
Figure 2B:
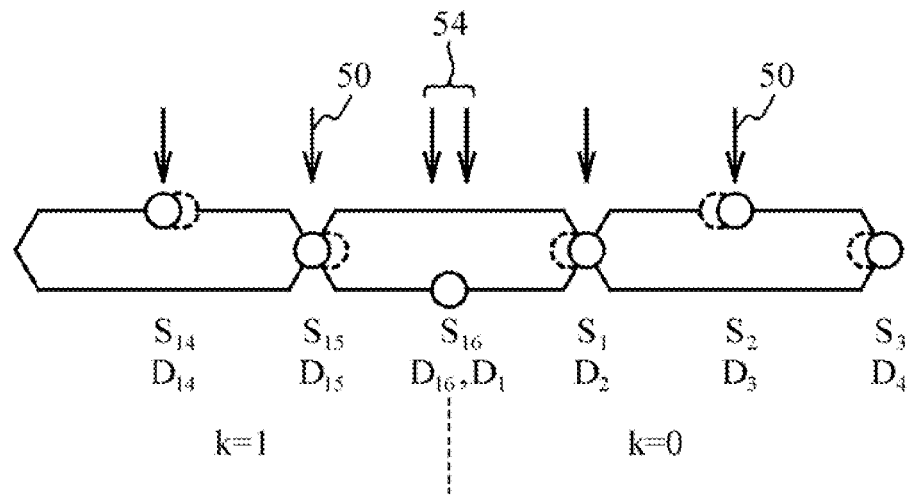
FIG. 2B is a diagram illustrating a signal with respect to a time in timing when the interpolation coefficient k is changed from 1 to 0.

FIG. 2A is a diagram illustrating a signal with respect to a time in timing when the interpolation coefficient k is changed from 0 to 1, and FIG. 2B is a diagram illustrating a signal with respect to a time in timing when the interpolation coefficient k is changed from 1 to 0. It is assumed that, in FIG. 2A, the interpolation coefficient k is changed from 0 to 1 when the input data S16 is processed. The interpolation data and the input data are overlapped mostly. Until inputting the input data S16, the input data Sn−1 is sampled as the interpolation data Dn. When the input data S16 is inputted, the interpolation data is not generated. When and after the input data S1 is inputted, the input data Sn is sampled as the interpolation data Dn. Thus, the input data Sn other than the input data S16 are sampled as the interpolation data Dn as illustrated by arrows 50, but the input data S16 is not sampled as the interpolation data as illustrated by a dotted arrow 52. Therefore, the interpolation data lacks. It is assumed that, in FIG. 2B, the interpolation coefficient k is changed from 1 to 0 when the input data S16 is processed. The interpolation data and the input data are overlapped mostly. Until inputting the input data S16, the input data Sn is sampled as the interpolation data Dn. When the input data S16 is inputted, the interpolation data D16 and D1 are generated. When and after the input data S1 is inputted, the input data Sn is sampled as the interpolation data Dn+1. Thus, the input data other than the input data S16 are sampled as the interpolation data as illustrated by arrows 50, but the input data S16 is sampled as the overlapped interpolation data D16 and D1 as illustrated by arrows 54.

As described above, in the receiving circuit of the comparative embodiment, a cycle slip in which the interpolation data lacks may occur. A method to increase the sampling frequency and perform oversampling is considered as a method to restrain the lack of data. For example, the sampling frequency is set to 10 times of the frequency of the input data. Thereby, the number of samples per one unit increases more than the number of samples calculated in the comparative embodiment (e.g. the number of samples is two in the case of the 2× system). Therefore, even when the lack of data occurs, the lacked data can be added by selecting another data according to need. However, even if the oversampling for high-speed data communication more than 10 Gbps or more than 1 Gbps is used, it is difficult to perform the sampling of the high frequency. Even when the sampling of the high frequency can be performed, a power consumption increases since an operating frequency becomes high.

A method to adjust the sampling frequency so that the sampling frequency is always higher than the frequency of the input data is considered as the method to restrain the lack of input data. However, in this method, the independent oscillators are provided in a transmitting side and a receiving side. Therefore, the device becomes large in size, and the power consumption increases.

In the following description, a first embodiment which restrains the lack of the interpolation data without using the above-mentioned method is described.

Figure 3:
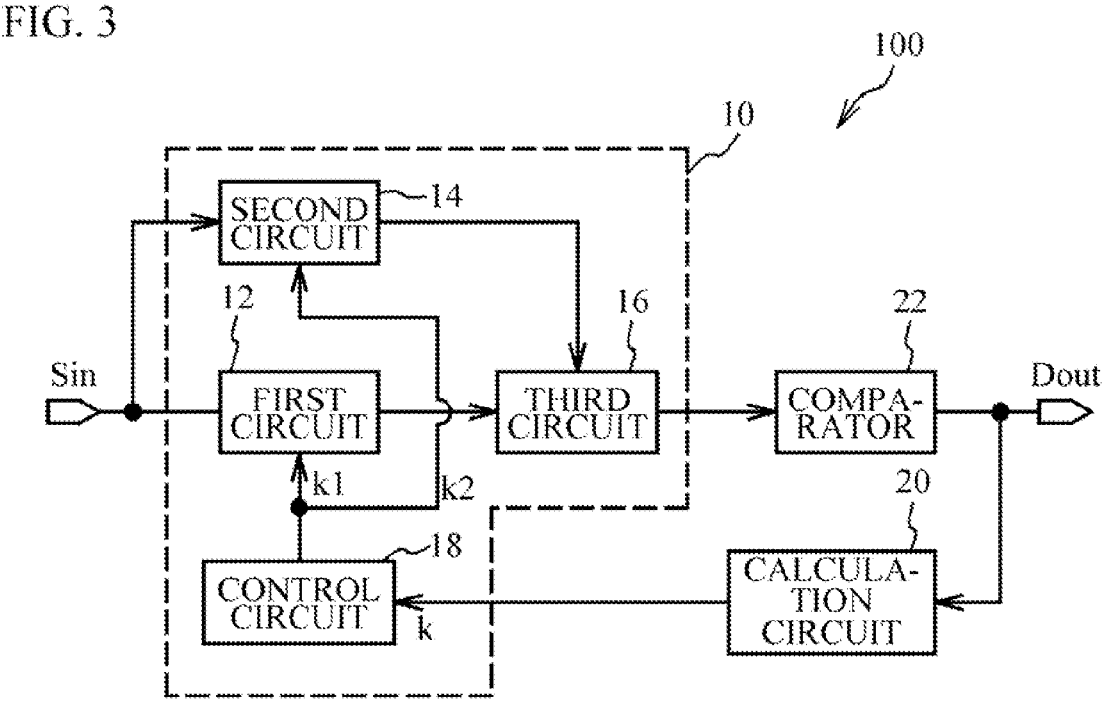
FIG. 3 is a block diagram of a receiving circuit according to a first embodiment.

FIG. 3 is a block diagram of a receiving circuit according to the first embodiment. As illustrated in FIG. 3, a receiving circuit 100 includes the interpolation circuit 10, the calculation circuit 20 and the comparator 22. The interpolation circuit 10 includes a first circuit 12, a second circuit 14, a third circuit 16, and a control circuit 18. The first circuit 12 generates first interpolation data based on a plurality pieces of data among data inputted in time series, using an interpolation coefficient k1. In timing when a part of input data in the first circuit 12 lacks, the second circuit 14 generates second interpolation data based on a plurality pieces of data, using an interpolation coefficient k2 different from the interpolation coefficient k1 of the first circuit 12. The third circuit 16 adds the second interpolation data to a location in the first interpolation data where a part of input data has lacked. The control circuit 18 keeps the interpolation coefficient k1 constant within a given period, and changes the interpolation coefficient k1 to be supplied to the first circuit 12 for each given period. The control circuit 18 supplies to the second circuit 14 the interpolation coefficient k2 different from the interpolation coefficient k1 of the first circuit 12. Other configurations are the same as those of the comparative embodiment of FIG. 1, and hence a description thereof is omitted.

Figure 4:
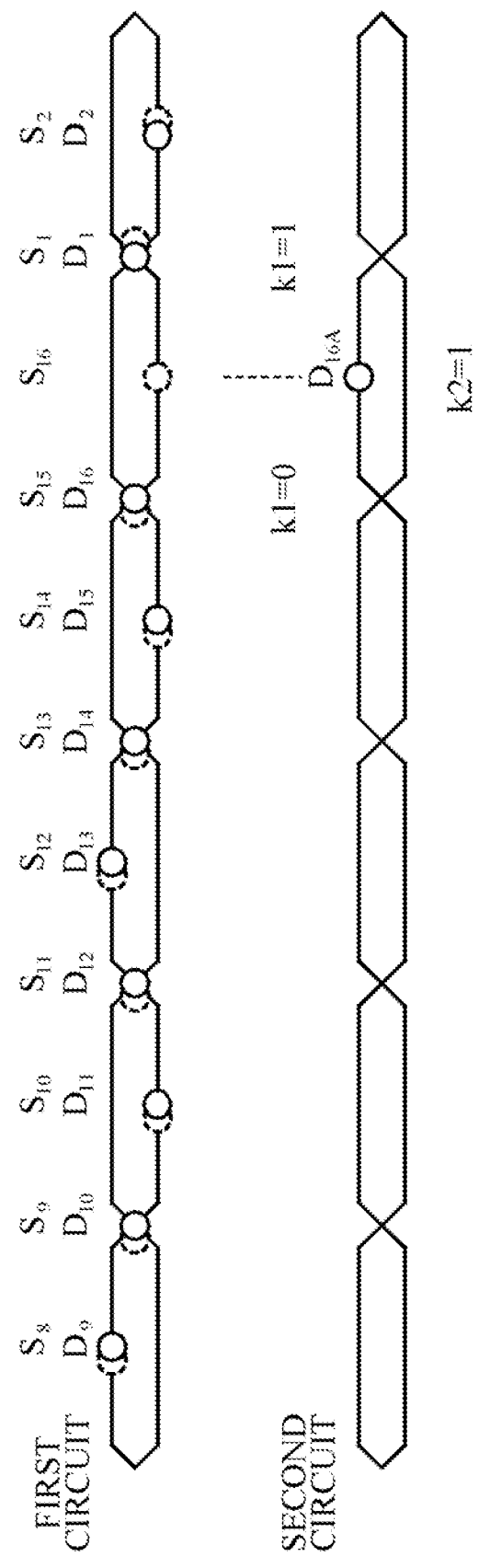
FIG. 4 is a diagram illustrating the operation of an interpolation circuit according to the first embodiment.

FIG. 4 is a diagram illustrating the operation of an interpolation circuit according to the first embodiment, and illustrates signals with respect to time. Referring to FIG. 4, the first circuit 12 generates the interpolation data using the interpolation coefficient k1, as is the case with the interpolation circuit of the comparative embodiment. It is assumed that the interpolation coefficient k1 is changed from 0 to 1 when the first circuit 12 processes the input data S16. At this time, the input data S16 is not sampled as the first interpolation data by the first circuit 12, and hence the input data S16 lacks. The second circuit 14 sets the interpolation coefficient k2 when processing the input data S16 as 0 or 1, and generates the second interpolation data D16A. The third circuit 16 adds the second interpolation data D16A between the first interpolation data D16 and D1.

According to the first embodiment, the second circuit 14 generates the second interpolation data based on a plurality of pieces of data, in timing when a part of input data inputted in time series in the first circuit 12 lacks. The third circuit 16 adds the second interpolation data to a location in the first interpolation data where a part of input data has lacked. Thereby, the receive data without lack can be obtained.

The control circuit 18 changes the interpolation coefficient supplied to the first circuit 12 for each give period. The first circuit 12 generates the first interpolation data using an interpolation coefficient. The second circuit 14 generates the second interpolation data using another interpolation coefficient different from the interpolation coefficient of the first circuit 12. Thereby, when the interpolation coefficient of the first circuit 12 is changed, the second circuit 14 generates the second interpolation data using another interpolation coefficient different from the interpolation coefficient of the first circuit 12. Therefore, when the input data is lacked, more exact interpolation data can be generated.

Figure 5:
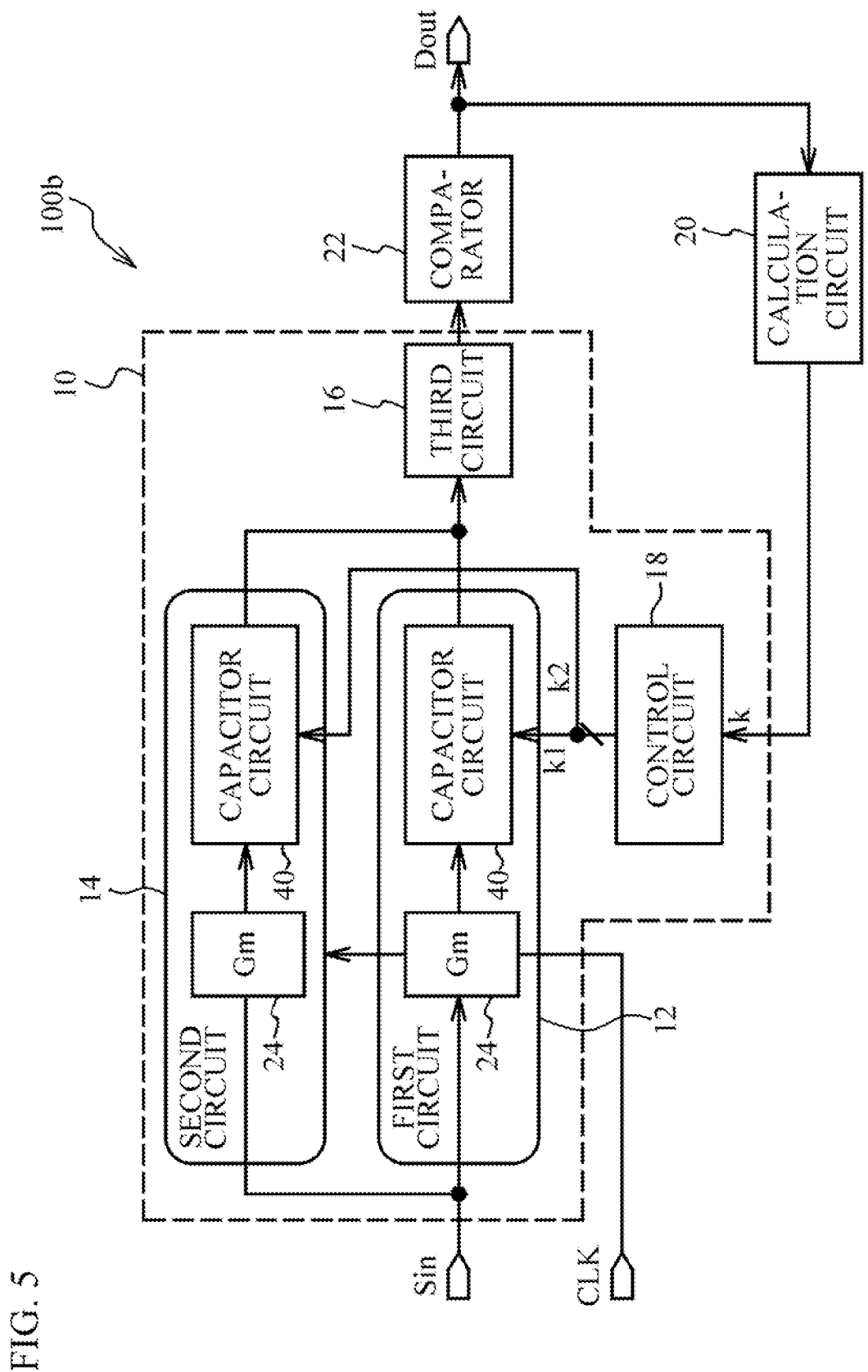
FIG. 5 is a block diagram of the receiving circuit according to a second embodiment.

(EMBODIMENT 2) FIG. 5 is a block diagram of the receiving circuit according to a second embodiment. In a receiving circuit 100b, the first circuit 12 includes a Gm circuit 24 and a capacitor circuit 40. The second circuit 14 also includes a Gm circuit 24 and a capacitor circuit 40. A clock signal for sampling is inputted to the first circuit 12 and the second circuit 14. The Gm circuit 24 converts a voltage into a current. Other configurations are the same as those of the first embodiment of FIG. 3, and hence a description thereof is omitted.

Figure 6:
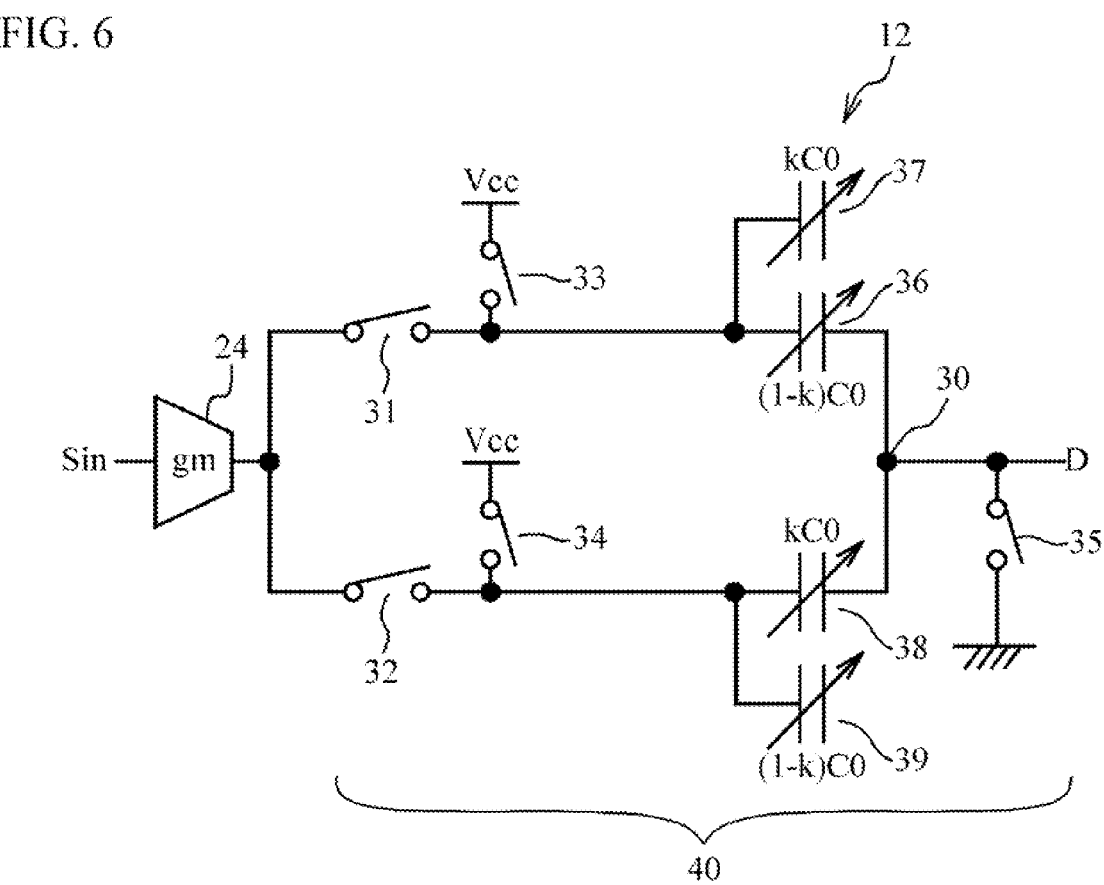
FIG. 6 is a circuit diagram illustrating a switched capacitor.

FIG. 6 is a circuit diagram illustrating a switched capacitor circuit. As illustrated in FIG. 6, the first circuit 12 includes a Gm circuit 24 and a capacitor circuit 40. The capacitor circuit 40 includes switches 31 to 35, and variable capacitors 36 to 39. The input data Sin which is a voltage signal is inputted to the Gm circuit 24. The Gm circuit 24 converts the voltage signal into a current signal. The output of the Gm circuit 24 is inputted to one ends of the variable capacitors 36 and 38 via the switches 31 and 32, respectively. Other ends of the variable capacitors 36 and 38 are synthesized at a synthesis node 30. The synthesis node 30 outputs interpolation data D. The switches 33 and 34 are connected between one ends of the variable capacitors 36 and 38, and a power supply Vcc, respectively. The switch 35 is connected between the synthesis node 30 and a ground. The variable capacitors 37 and 39 are connected in parallel with the variable capacitors 36 and 38, respectively. When a capacitance value of the variable capacitors 36 is "(1-k)C0", the capacitance value of the variable capacitor 37 is "KC0". When the capacitance value of the variable capacitor 38 is "KC0", the capacitance value of the variable capacitor 39 is "(1-k)C0". Thus, regardless of the interpolation coefficient k, the sum of capacitance values of the variable capacitors 36 and 37 is constant. Regardless of the interpolation coefficient k, the sum of capacitance values of the variable capacitors 38 and 39 is constant.

Figure 7:
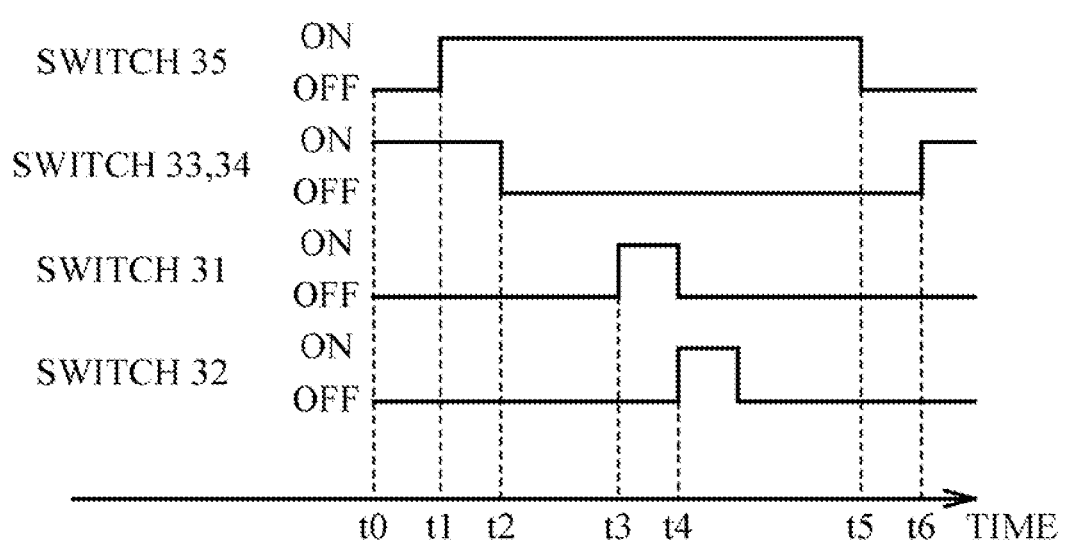
FIG. 7 is a timing chart illustrating the operation of each switch in the switched capacitor.

FIG. 7 is a timing chart illustrating the operation of each switch in the switched capacitor circuit. Referring to FIG. 7, at a time t0, the switches 31, 32 and 35 are turned off, and the switches 33 and 34 are turned on. The switch 35 is turned on at a time t1, and the switches 33 and 34 are turned off at a time t2. The switch 31 is turned on for a certain period (e.g. 0.5 unit) from a time t3. An electric charge that has integrated a current value for the certain period is accumulated in the variable capacitor 36. A voltage which has multiplied the electric charge by the reciprocal of the capacitance value (1-k)C0 occurs between the variable capacitor 36. The switch 32 is turned on for a certain period (e.g. 0.5 unit) from a time t4. An electric charge that has integrated a current value for the certain period is accumulated in the variable capacitor 38. A voltage which has multiplied the electric charge by the reciprocal of the capacitance value kC0 occurs between the variable capacitor 38. The periods which turn on the switches 31 and 32 can be set freely. The switch 35 is turned off at a time t5. The switches 33 and 34 are turned on at a time t6. The switches 33 and 34 are turned on and the switch 35 is turned off, so that the electric charges accumulated in the variable capacitors 36 and 38 are changed to a standard of the power supply Vcc, and are synthesized at the synthesis node 30. The switches 31 and 32 are turned on at the time that the input data Sn-1 and Sn should be sampled, respectively, so that a voltage which is proportional to "(1-k)×Sn-1+k×Sn" is generated at the synthesis node 30 in a period (i.e., a period equivalent from the time t1 to the time t2) after the time t6. Thereby, the interpolation data corresponding to the Dn can be generated at the synthesis node.

As described above, in the capacitor circuit 40, the capacitance values of the variable capacitor 36 (i.e., a first variable capacitor) and the variable capacitor 38 (i.e., a second variable capacitor) are changeable according to the interpolation coefficient k. The switch 31 (i.e., a first switch) and the switch 32 (i.e., a second switch) apply currents corresponding to the input data Sn-1 and Sn to the variable capacitors 36 and 38 in timing when the variable capacitor 36 is earlier than the variable capacitor 38. The synthesis node 30 (i.e., a synthesis portion) generates the interpolation data Dn by synthesizing the electric charges of the variable capacitors 36 and 38. Thus, the interpolation data can be generated according to the interpolation coefficient k.

Here, the capacitance values of the variable capacitors 36 and 38 are changed so that the sum of the capacitance values of the variable capacitors 36 and 38 becomes constant. Thereby, the capacitance values of the variable capacitors 36 and 38 can be changed according to the interpolation coefficient k.

In the circuit illustrated in FIG. 6, only one interpolation data is generable as illustrated in FIG. 7. Therefore, the first circuit 12 includes a plurality of capacitor circuits 40. Thereby, it is possible to generate sampling timing of each of data S1 to Sn, generate the interpolation data, and secure time to charge the variable capacitors 36 and 38.

Figure 8:
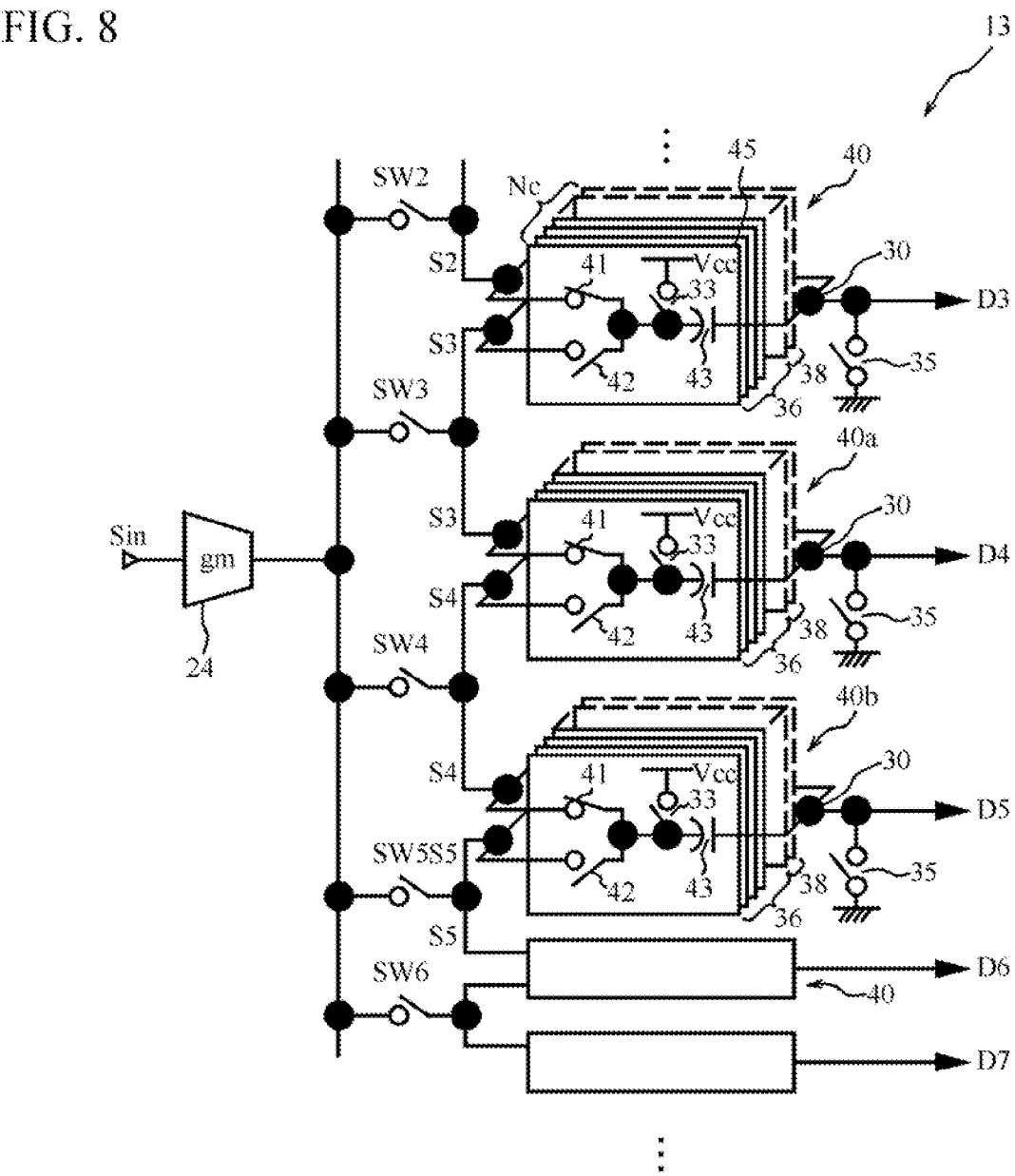
FIG. 8 is a circuit diagram illustrating a circuit that is provided with a plurality of capacitor circuits.

FIG. 8 is a circuit diagram illustrating a circuit that is provided with a plurality of capacitor circuits. Referring to FIG. 8, a circuit 13 includes the Gm circuit 24 and the plurality of capacitor circuits 40. The number of capacitor circuits 40 is "N". Each capacitor circuit 40 includes a plurality of slices 45 (e.g. the number of slices 45) is "Nc". Each of the slices 45 includes switches 33, 41 and 42, and a capacitor 43. The switch 41 is connected between a switch SWn-1 (n is a natural number from 1 to N) and one end of the capacitor 43. The switch 42 is connected between a switch SWn and the one end of the capacitor 43. Another end of the capacitor 43 is connected to the synthesis node 30. Each switch 33 is the same as the switch 33 in FIG. 6, and connected between the one end of the capacitor 43 and the power supply Vcc. The reason why the switch 33 is provided in each slice 45 is for making it possible to charge all the capacitors 43.

The Nc slices 45 are connected in parallel. The capacitance values of the capacitors 43 in the Nc slices 45 are the same as each other. The switches 41 and 42 are mutually and complementarily turned on and off. That is, when the switch 41 is turned on, the switch 42 is turned off. When the switch 41 is turned off, the switch 42 is turned on. Thereby, the capacitors 43 in the slices 45 in which the switches 41 are turned on are connected in parallel with the switch SWn-1, and correspond to the variable capacitor 36. The capacitors 43 in the slices 45 in which the switches 42 are turned on are connected in parallel with the switch SWn, and correspond to the variable capacitor 38. Therefore, the sum of the capacitance values of the variable capacitors 36 and 38 is the same as that of FIG. 6. In the following description, it is assumed that a variable kn is set as any one of 0 to Nc, the variable kn is 0 when the interpolation coefficient k is 0, and the variable kn is Nc when the interpolation coefficient k is 1. That is, the variable kn is expressed by "k×Nc". In the Nc slices 45, the switches 41 in (Nc-Kn) slices 45 are turned on, and Kn switches 42 are turned on. Thereby, the interpolation data which is proportional to "(Nc-kn)/Nc×Sn-1+kn/Nc×Sn" is outputted to the synthesis node 30. In FIG. 8, the slices 45 included in the variable capacitor 36 are illustrated by solid lines, and the slices 45 included in the variable capacitor 38 are illustrated by dashed lines. Subsequent figures are also illustrated in the same manner as FIG. 8.

Figure 9:
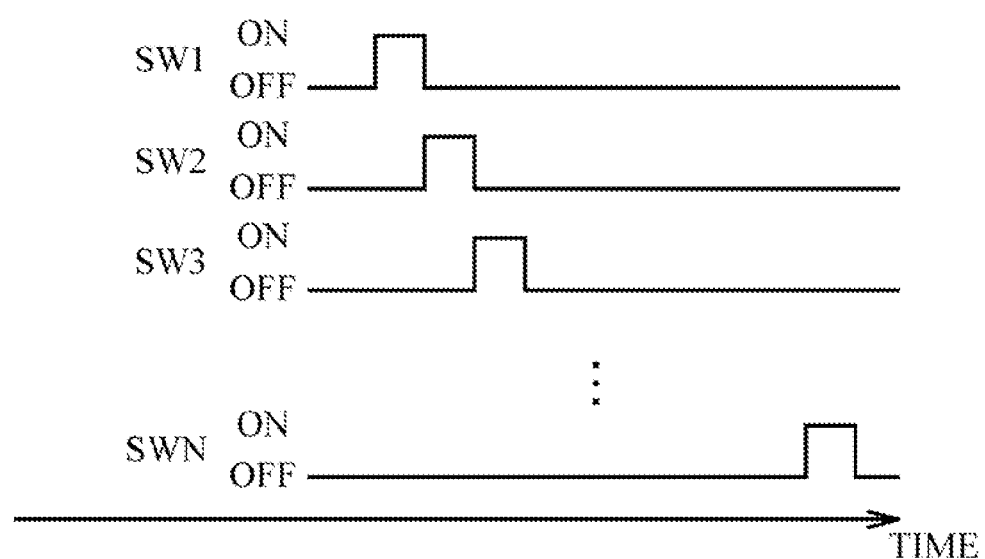
FIG. 9 is a timing chart of switches SW1 to SWN.

FIG. 9 is a timing chart of the switches SW1 to SWN. As illustrated in FIG. 9, the switches SW1 to SWN are turned on in timing corresponding to time-series data S1 to Sun, respectively. Thereby, the interpolation data D1 to DN can be generated in response to the time series.

As described above, the circuit 13 includes the plurality of capacitor circuits 40 corresponding to the plurality of pieces of data S1 to S16 within a given period. Here, a description is given of two capacitor circuits 40a and 40b corresponding to time-series adjacent data S3 and S4. The second variable capacitor 38 of one capacitor circuit (i.e., the capacitor circuit 40a) in the capacitor circuits 40a and 40b that corresponds to early data of the time-series data, and the first variable capacitor 36 of another capacitor circuit (i.e., the capacitor circuit 40b) in the capacitor circuits 40a and 40b have a switch SW4 in common. Thereby, a current is applied to the second variable capacitor 38 of the capacitor circuit 40a and the first variable capacitor 36 of the capacitor circuit 40b at the same time. Thus, since the switch SW4 is shared, the switch SW4 can supply data S4 to the capacitor circuits 40a and 40b.

When the capacitance values of the capacitors 43 in all capacitor circuits 40 are the same as each other, the current is supplied from the switch SW4 to kn capacitors 43 in the capacitor circuit 40a and (Nc−kn) capacitors 43 in the capacitor circuit 40b. With respect to the switch SW3, the current is supplied in the same manner as the switch SW4. The capacitance values of the capacitors as seen from the respective switches SW1 to SWN are the same as each other. Thereby, when the same currents flow to the capacitors 43 in the respective capacitor circuits 40, the same voltages occur. If the capacitance values of the capacitors as seen from the respective switches SW1 to SWN are different from each other, different voltages occur even when the same currents flow to the capacitors 43. Therefore, correct interpolation data is not generated.

Figure 10:
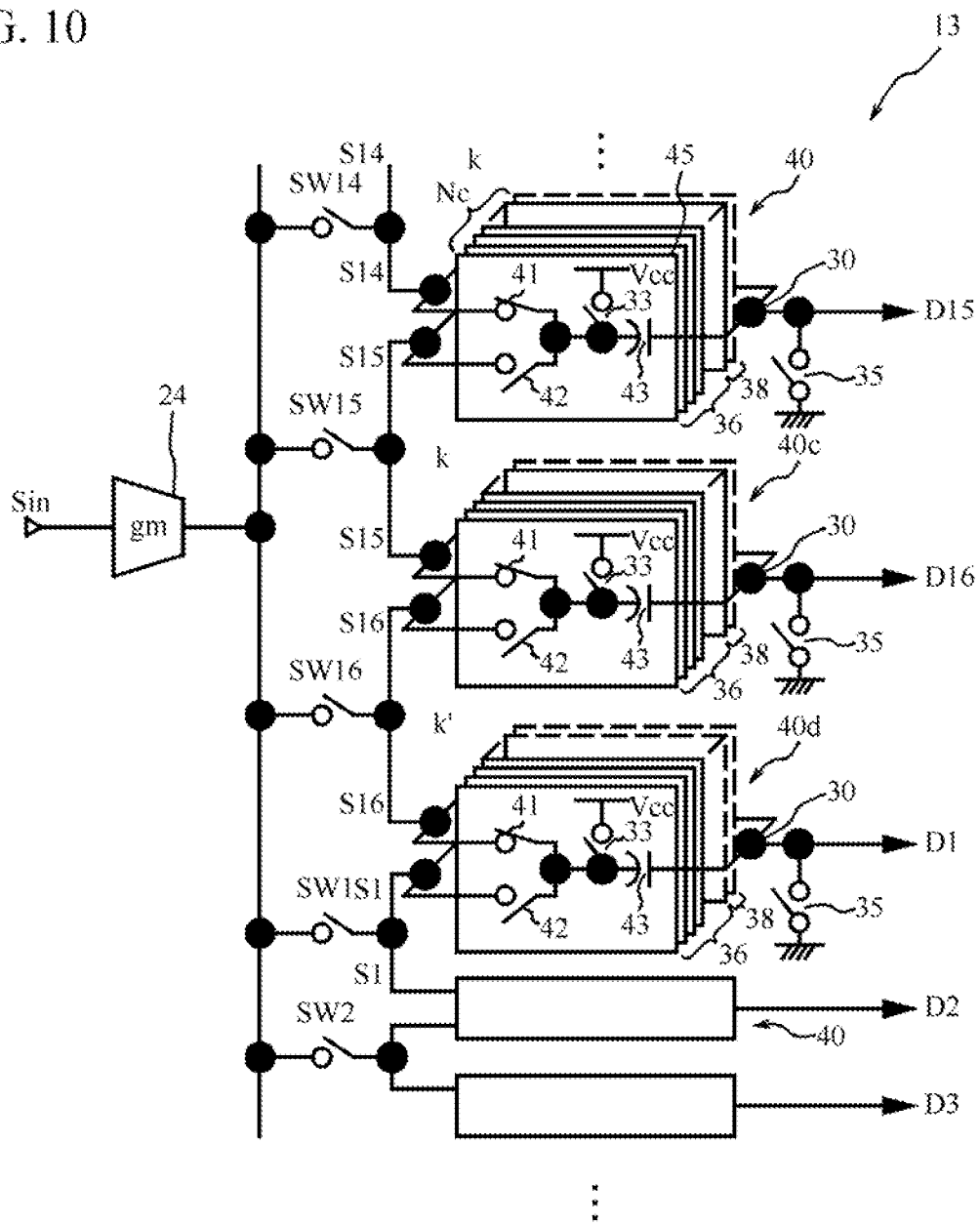
FIG. 10 is a diagram illustrating a case where an interpolation coefficient in the circuit of FIG. 8 is changed.

Next, a description is given of a case where the interpolation coefficient in the circuit of FIG. 8 is changed. FIG. 10 is a diagram illustrating the case where the interpolation coefficient in the circuit of FIG. 8 is changed. The circuitry of FIG. 10 is the same as that of FIG. 8. It is assumed that the timing that the control circuit 18 changes the interpolation coefficient k is for each given period (e.g. for each 16 data, or some data other than 16 data), and the interpolation coefficient is changed from k to k' between the capacitor circuits 40c and 40d. In the capacitor circuit 40c, the number of capacitors 43 connected to the switch SW15 is "Nc−1", and the number of capacitors 43 connected to the switch SW16 is "1". In the capacitor circuit 40d, the number of capacitors 43 connected to the switch SW16 is "Nc−2", and the number of capacitors 43 connected to the switch SW1 is "2". Thereby, the number of capacitors 43 seen from the switch SW16 is "Nc−1". Therefore, the interpolation data D16 and D1 generated using the input data S16 become incorrect.

Figure 11:
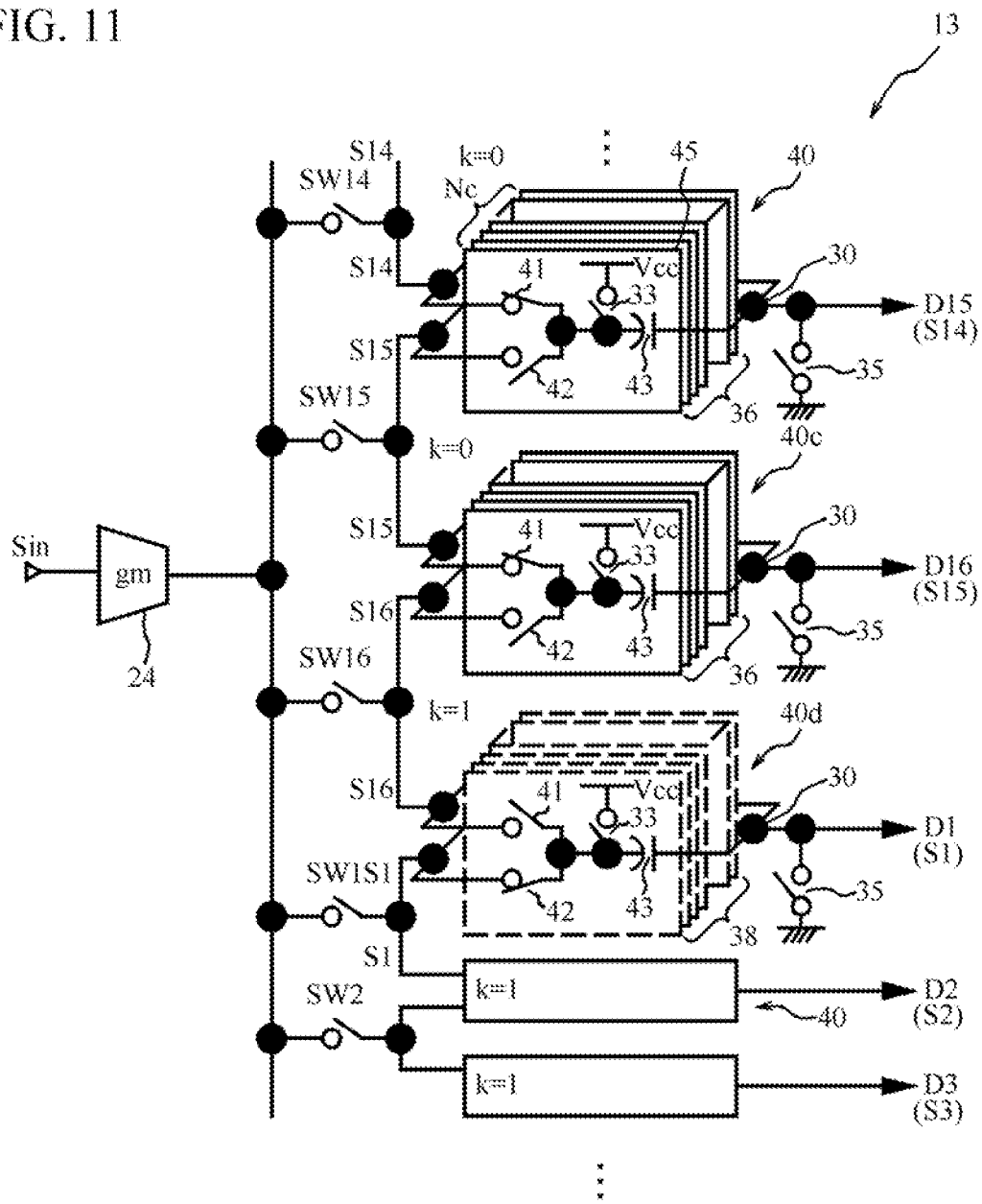
FIG. 11 is a diagram illustrating a case where the interpolation coefficient k in the circuit of FIG. 8 is changed from 0 to 1.

Next, a description is given of a case where the interpolation coefficient k in the circuit of FIG. 8 is changed from 0 to 1 (i.e., the variable kn is changed from 0 to Nc). FIG. 11 is a diagram illustrating the case where the interpolation coefficient k in the circuit of FIG. 8 is changed from 0 to 1. The circuitry of FIG. 11 is the same as that of FIG. 8. It is assumed that the interpolation coefficient k is changed from 0 to 1 between the capacitor circuits 40c and 40d, for example. In the capacitor circuit 40c, all capacitors 43 are connected to the switch SW15, and the capacitors 43 are not connected to the switch SW16. In the capacitor circuit 40d, the capacitors 43 are not connected to the switch SW16, and all capacitors 43 are connected to the switch SW1. Thereby, the interpolation data D16 outputted from the capacitor circuit 40c corresponds to the input data S15, and the interpolation data D1 outputted from the capacitor circuit 40d corresponds to the input data S1. Therefore, the interpolation data corresponding to the input data S16 is not outputted.

Thus, when the interpolation circuit is formed by only the circuit 13 having the plurality of capacitor circuits 40, the lack of the input data occurs.

Figure 12:
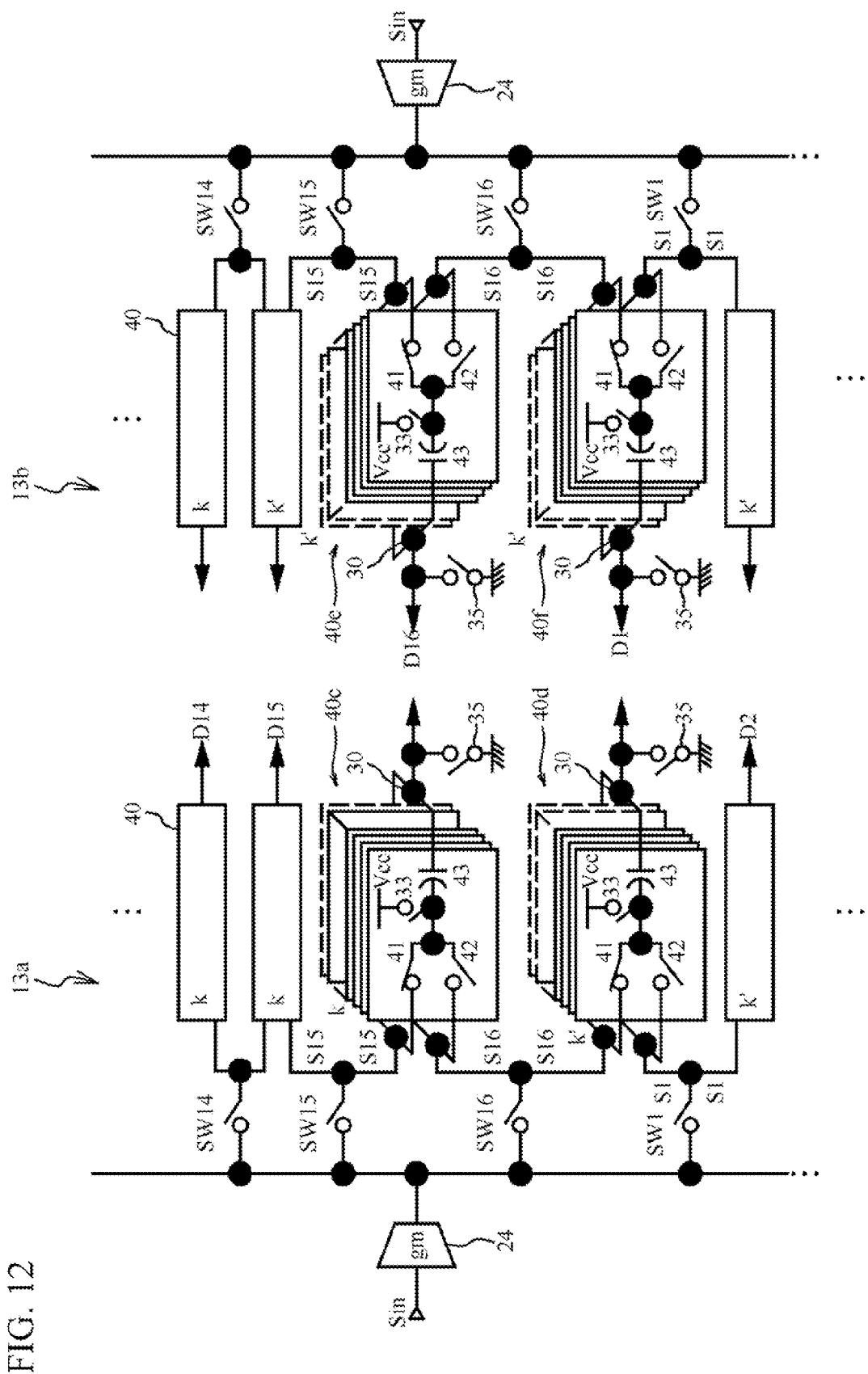
FIG. 12 is a circuit diagram of the interpolation circuit according to a second embodiment.

FIG. 12 is a circuit diagram of the interpolation circuit according to a second embodiment. Circuits 13a and 13b each of which is the same as the circuit 13 illustrated in FIG. 10 are provided as illustrated in FIG. 12. In the circuits 13a and 13b, the same switches SWn operate at the same timing. In the circuit 13a, the interpolation coefficient k is changed from k to k' between two capacitor circuits 40c and 40d connected to the switch SW16. On the contrary, in the circuit 13b, the interpolation coefficient k is changed from k to k' between two capacitor circuits 40 connected to the switch SW14. Thus, the timing which changes the interpolation coefficient of the circuit 13a differs from that of the circuit 13b, for example, by a period corresponding to two or more capacitor circuits 40. In the circuit 13a, the outputs of the capacitor circuits 40c and 40d are incorrect. On the contrary, in the circuit 13b, the outputs of the capacitor circuits 40 connected to the switch SW14 are incorrect. Therefore, the third circuit 16 selects data of the circuit 13a as the interpolation data D14 and D15, and selects data of the circuit 13b as the interpolation data D16 and D1. In addition, the third circuit 16 selects data of the circuit 13a as the interpolation data D2 again. Thereby, correct interpolation data can be outputted.

Figure 13:
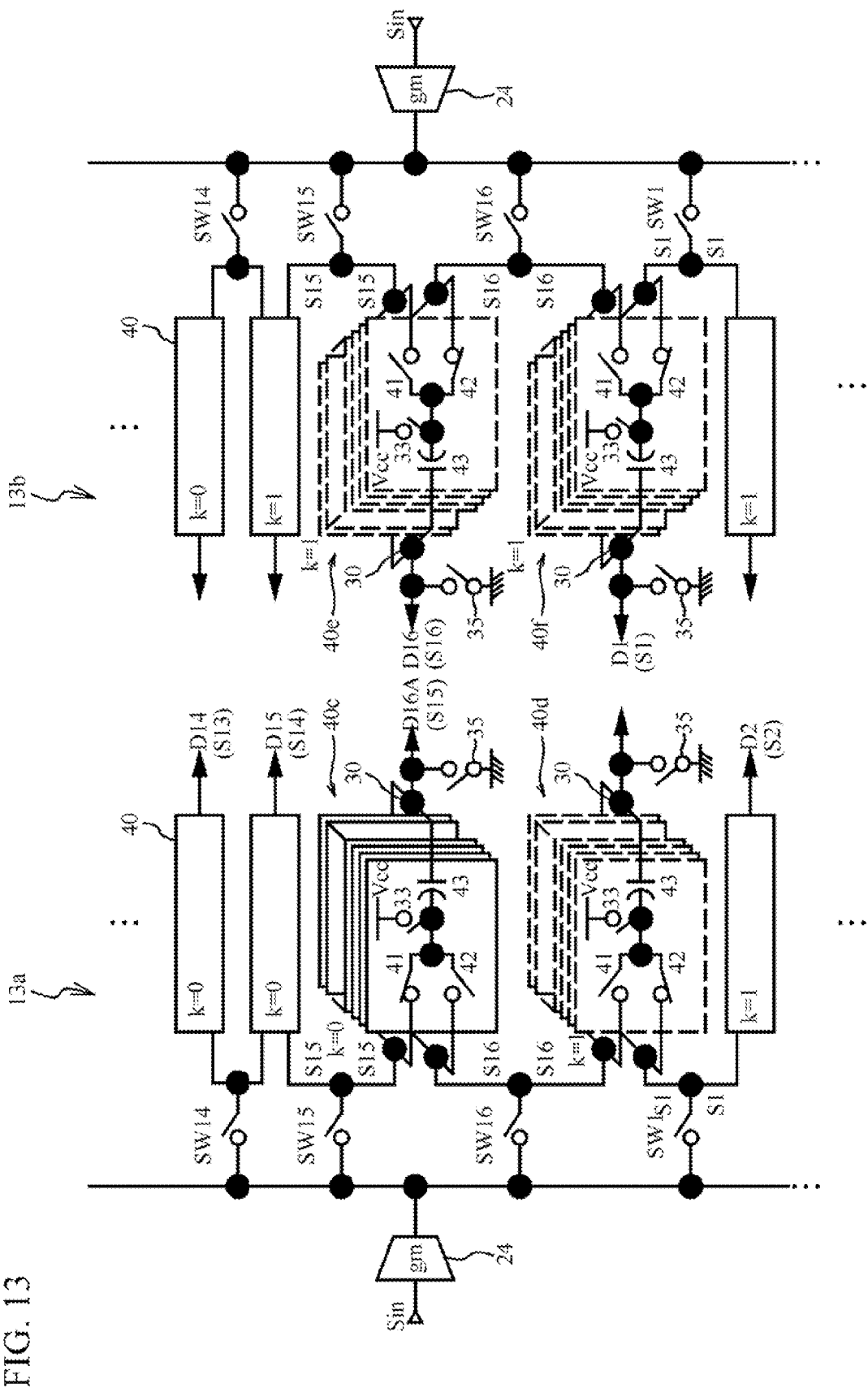
FIG. 13 is a diagram illustrating a case where the interpolation coefficient k is changed from 0 to 1 in the second embodiment.

In the second embodiment, a description is given of a case where the interpolation coefficient k is changed from 0 to 1 (i.e., the variable kn is changed from 0 to Nc). FIG. 13 is a diagram illustrating a case where the interpolation coefficient k is changed from 0 to 1 in the second embodiment. In the circuit 13a, the interpolation coefficient k is changed from 0 to 1 between the capacitor circuits 40c and 40d, as illustrated in FIG. 13. In the circuit 13b, the interpolation coefficient k is changed from 0 to 1 between two capacitor circuits 40 connected to the switch SW14. The third circuit 16 selects data of the circuit 13a as the interpolation data D14, D15 and D2, and selects data of the circuit 13b as the interpolation data D16 and D1. Further, the third circuit 16 adds the output of the capacitor circuit 40c between the interpolation data D15 and D16, as interpolation data D16A. Thereby, the interpolation data D14, D15, D16A, D16, D1 and D2 correspond to the input data S13, S14, S15, S16, S1 and S2, respectively. Therefore, the lack of the input data explained in FIG. 11 can be restrained. The third circuit 16 may add the output of the capacitor circuit 40d between the interpolation data D16 and D1, as the interpolation data D16A. Thereby, the interpolation data D14, D15, D16, D16A, D1 and D2 correspond to the input data S13, S14, S15, S16, S1 and S2, respectively. In the case of FIG. 13, each of the capacitor circuits 40c and 40d has no capacitors 43 connected from the switch SW16, and hence the capacitor circuits 40c and 40d receive the currents from the switches SW 15 and SW1, respectively. The number of capacitors 43 seen from each of the switches SW 15 and SW1 is Nc, so that the outputs of the capacitor circuits 40c and 40d become correct.

Figure 14:
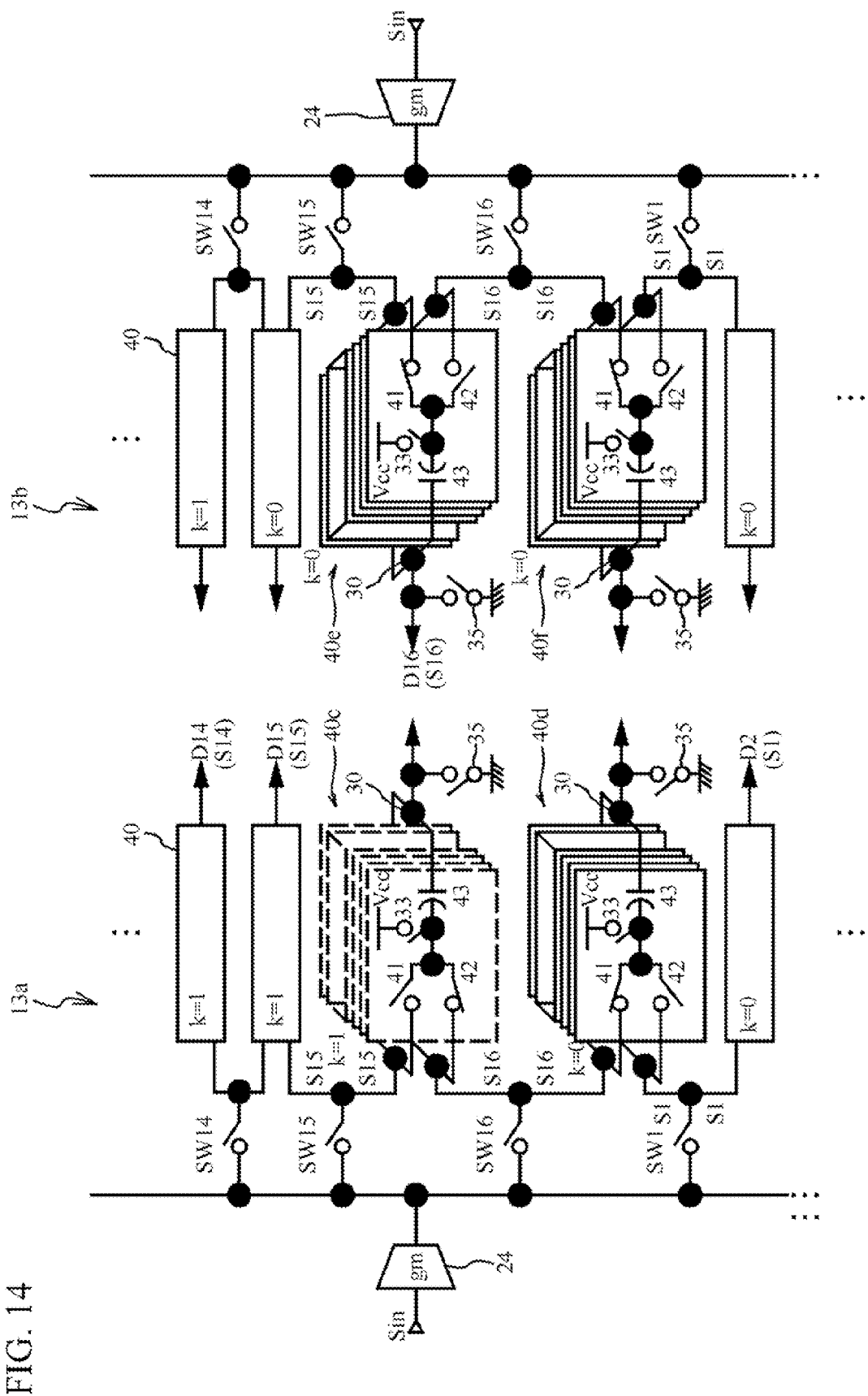
FIG. 14 is a diagram illustrating a case where the interpolation coefficient k is changed from 1 to 0 in the second embodiment.

In the second embodiment, a description is given of a case where the interpolation coefficient k is changed from 1 to 0 (i.e., the variable kn is changed from Nc to 0). FIG. 14 is a diagram illustrating the case where the interpolation coefficient k is changed from 1 to 0 in the second embodiment. In the circuit 13a, the interpolation coefficient k is changed from 1 to 0 between the capacitor circuits 40c and 40d, as illustrated in FIG. 14. In the circuit 13b, the interpolation coefficient k is changed from 1 to 0 between two capacitor circuits 40 connected to the switch SW14. The third circuit 16 selects data of the circuit 13a as the interpolation data D14, D15 and D2, and selects data of the circuit 13b as the interpolation data D16. Thus, the third circuit 16 does not select data of the capacitor circuit 40f. Thereby, the interpolation data D14, D15, D16 and D2 correspond to the input data S14, S15, S16 and 51, respectively. Therefore, overlapping data can be eliminated.

According to the second embodiment, the interpolation circuit 10 includes the circuits 13a and 13b. The circuit 13a includes the plurality of capacitor circuits 40 corresponding to the plurality of pieces of data S1 to S16 within a given period. The circuit 13b includes the plurality of capacitor circuits 40 corresponding to at least part of the plurality of pieces of data S1 to S16 within a given period. The control circuit 18 changes the interpolation coefficient to be supplied to the circuit 13b in timing different from change timing of the interpolation coefficient to be supplied to the circuit 13a. For example, the control circuit 18 changes the interpolation coefficient to be supplied to the circuit 13a in timing of turning-on of the switch SW13, and the interpolation coefficient to be supplied to the circuit 13b in timing of turning-on of the switch SW14. Thereby, the lack of data can be restrained as illustrated in FIG. 13. In addition, more exact interpolation data can be generated as illustrated in FIG. 11. Here, the circuit 13a corresponds to the first circuit 12 of FIG. 5, and the circuit 13b corresponds to the second circuit 14 of FIG. 5. The circuit 13b does not need to include the capacitor circuits 40 other than the capacitor circuits 40e and 40f generating the interpolation data.

Figure 15:
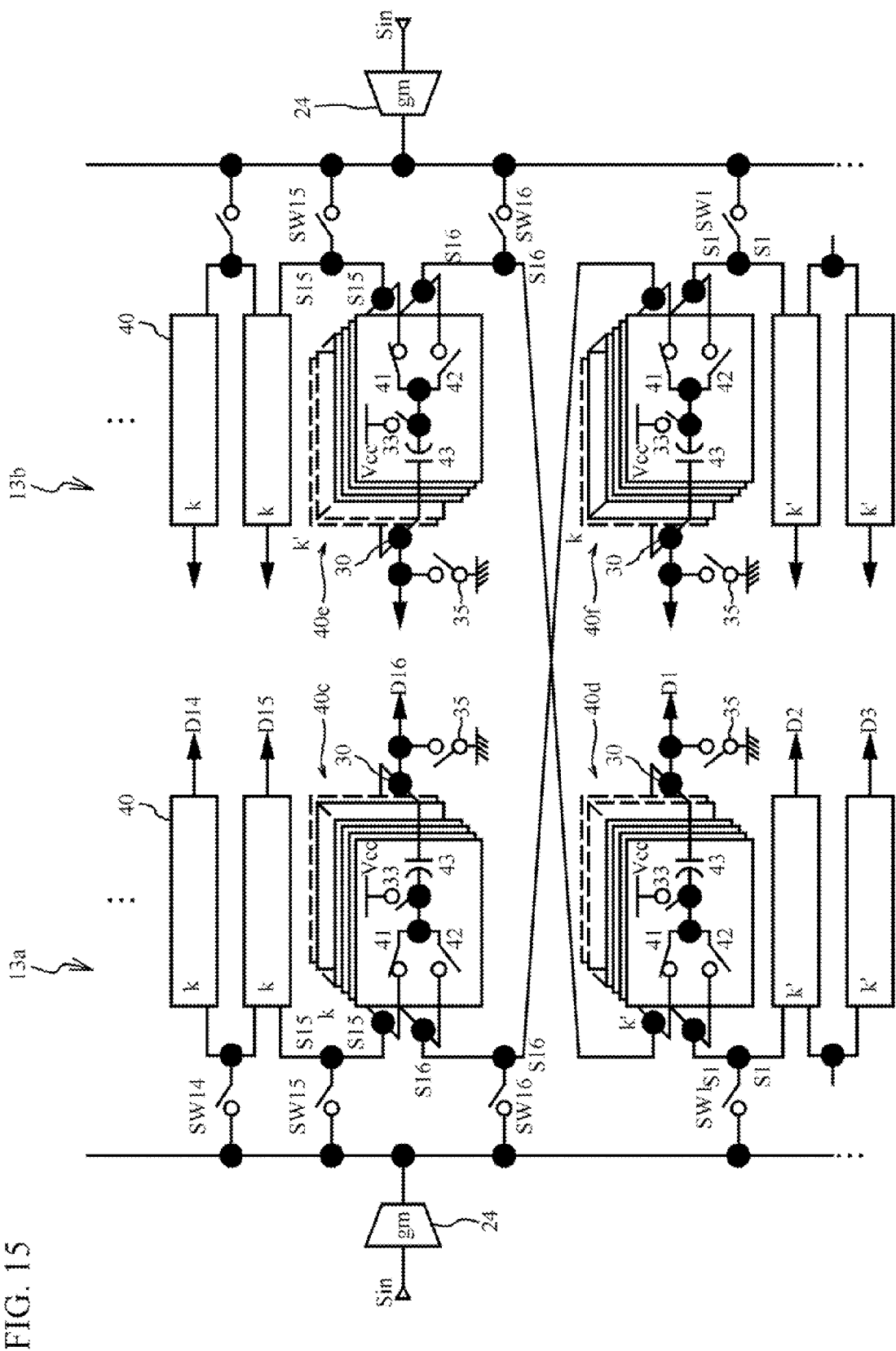
FIG. 15 is a circuit diagram of the interpolation circuit according to a third embodiment.

(EMBODIMENT 3) A block diagram of the receiving circuit according to a third embodiment is the same as FIG. 5 of the second embodiment, and hence a description thereof is omitted. FIG. 15 is a circuit diagram of the interpolation circuit according to the third embodiment. The switch SW16 in the circuit 13a is connected to the switch 41 of the capacitor circuit 40f in the circuit 13b. The switch SW16 in the circuit 13b is connected to the switch 41 of the capacitor circuit 40d in the circuit 13a. The connection from the switch SWn of the circuit 13a to the switch 41 of the circuit 13b and connection from the switch SWn of the circuit 13b to the switch 41 of the circuit 13a intersect at a location where the interpolation coefficient is changed. In the circuit 13a, the interpolation coefficient is changed from k to k' between the capacitor circuits 40c and 40d. The circuit 13b inverts the interpolation coefficient between the capacitor circuits 40e and 40f. That is, the interpolation coefficient of the capacitor circuit 40e is k' and the interpolation coefficient of the capacitor circuit 40f is k. In FIG. 15, the number of capacitors 43 connected to each switch SW16 is Nc, so that it is possible to restrain the interpolation data from being incorrect at the location where the interpolation coefficient is changed, as illustrated in FIG. 10.

Figure 16:
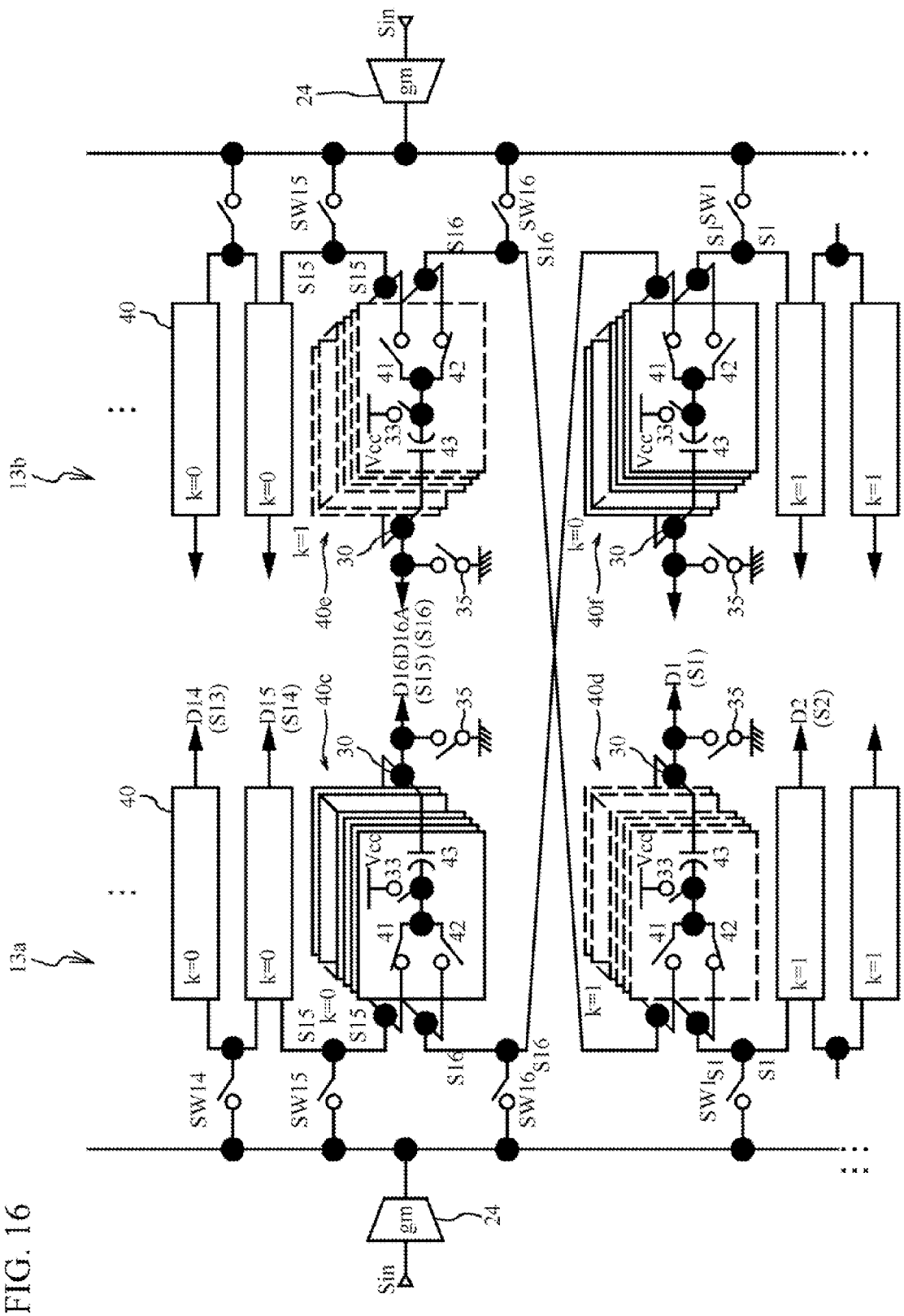
FIG. 16 is a diagram illustrating a case where the interpolation coefficient k is changed from 0 to 1 in the third embodiment.

In the third embodiment, a description is given of a case where the interpolation coefficient k is changed from 0 to 1 (i.e., the variable kn is changed from 0 to Nc). FIG. 16 is a diagram illustrating the case where the interpolation coefficient k is changed from 0 to 1 in the third embodiment. In the circuit 13a, the interpolation coefficient k is changed from 0 to 1 between the capacitor circuits 40c and 40d, as illustrated in FIG. 16. In the circuit 13b, the interpolation coefficients k of the capacitor circuits 40e and 40f are 1 and 0, respectively. The third circuit 16 selects data of the circuit 13a as the interpolation data D14, D15, D16, D1 and D2. Further, the third circuit 16 adds the output of the capacitor circuit 40e between the interpolation data D16 and D1, as the interpolation data D16A. Thereby, the interpolation data D14, D15, D16, D16A, D1 and D2 correspond to the input data S13, S14, S15, S16, S1 and S2, respectively. Therefore, the lack of the input data illustrated in FIG. 11 can be restrained.

Figure 17:
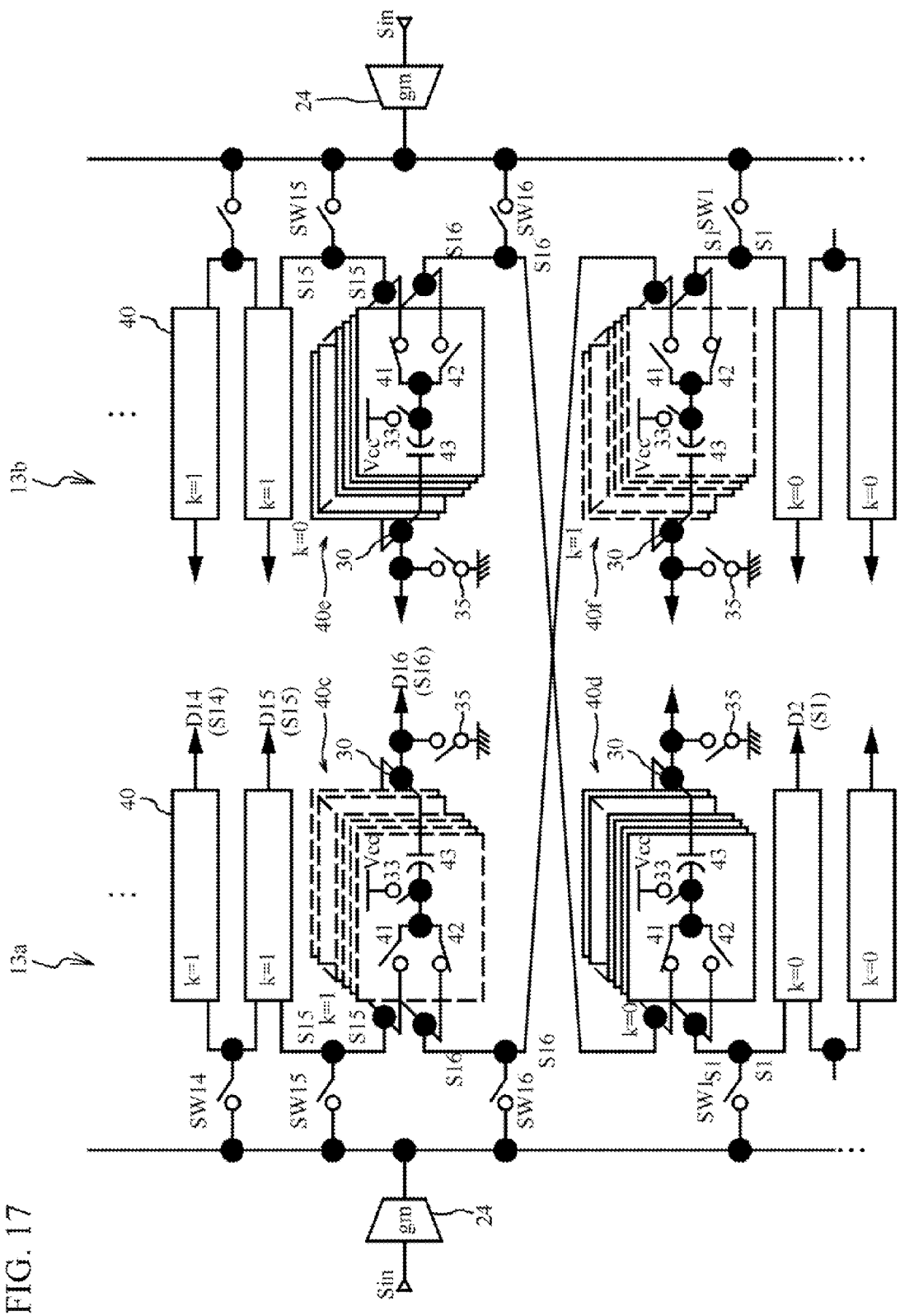
FIG. 17 is a diagram illustrating a case where the interpolation coefficient k is changed from 1 to 0 in the third embodiment.

In the third embodiment, a description is given of a case where the interpolation coefficient k is changed from 1 to 0 (i.e., the variable kn is changed from Nc to 0). FIG. 17 is a diagram illustrating the case where the interpolation coefficient k is changed from 1 to 0 in the third embodiment. In the circuit 13a, the interpolation coefficient k is changed from 1 to 0 between the capacitor circuits 40c and 40d, as illustrated in FIG. 17. In the circuit 13b, the interpolation coefficients k of the capacitor circuits 40e and 40f are 0 and 1, respectively. The third circuit 16 selects data of the circuit 13a as the interpolation data D14, D15, D16 and D2. Thus, the third circuit 16 selects data of the capacitor circuit 40d. Thereby, the interpolation data D14, D15, D16 and D2 correspond to the input data S14, S15, S16 and S1, respectively. Therefore, overlapping data can be eliminated.

It is assumed that the capacitor circuits 40 of the circuit 13a are first capacitor circuits, with reference to FIGS. 15 to 17. The first capacitor circuits 40c corresponds to one capacitor circuit that processes early data of the time-series data, among the two capacitor circuits 40c and 40d corresponding to the data S16 in which the interpolation coefficient of the circuit 13a is changed. The first capacitor circuit 40d corresponds to another capacitor circuit that processes late data of the time-series data, among the two capacitor circuits 40c and 40d. It is assumed that, in the circuit 13b, the two capacitor circuits 40e and 40f corresponding to the data S16 in which the interpolation coefficient of the circuit 13a is changed are second capacitor circuits. The second capacitor circuit 40e corresponds to one capacitor circuit that processes early data of the time-series data, among the two capacitor circuits 40e and 40f. The second capacitor circuits 40f corresponds to another capacitor circuit that processes late data of the time-series data, among the two capacitor circuits 40e and 40f. A current is applied to the second variable capacitor 38 of the first capacitor circuit 40c and the first variable capacitor 36 of the second capacitor circuit 40f at the same time by the switch SW16 of the circuit 13a. A current is applied to the first variable capacitor 36 of the first capacitor circuit 40d and the second variable capacitor 38 of the second capacitor circuit 40e at the same time by the switch SW16 of the circuit 13b. Thereby, the lack of the input data can be restrained as illustrated in FIG. 16. In addition, more exact interpolation data can be generated as illustrated in FIG. 15.

In the third embodiment, the capacitor circuit 40 of the first circuit 12 in FIG. 5 includes the plurality of first capacitor circuits other than the first capacitor circuits 40c and 40d, and the second capacitor circuits 40e and 40f. The capacitor circuit 40 of the second circuit 14 in FIG. 5 includes the first capacitor circuits 40c and 40d.

Figure 18:
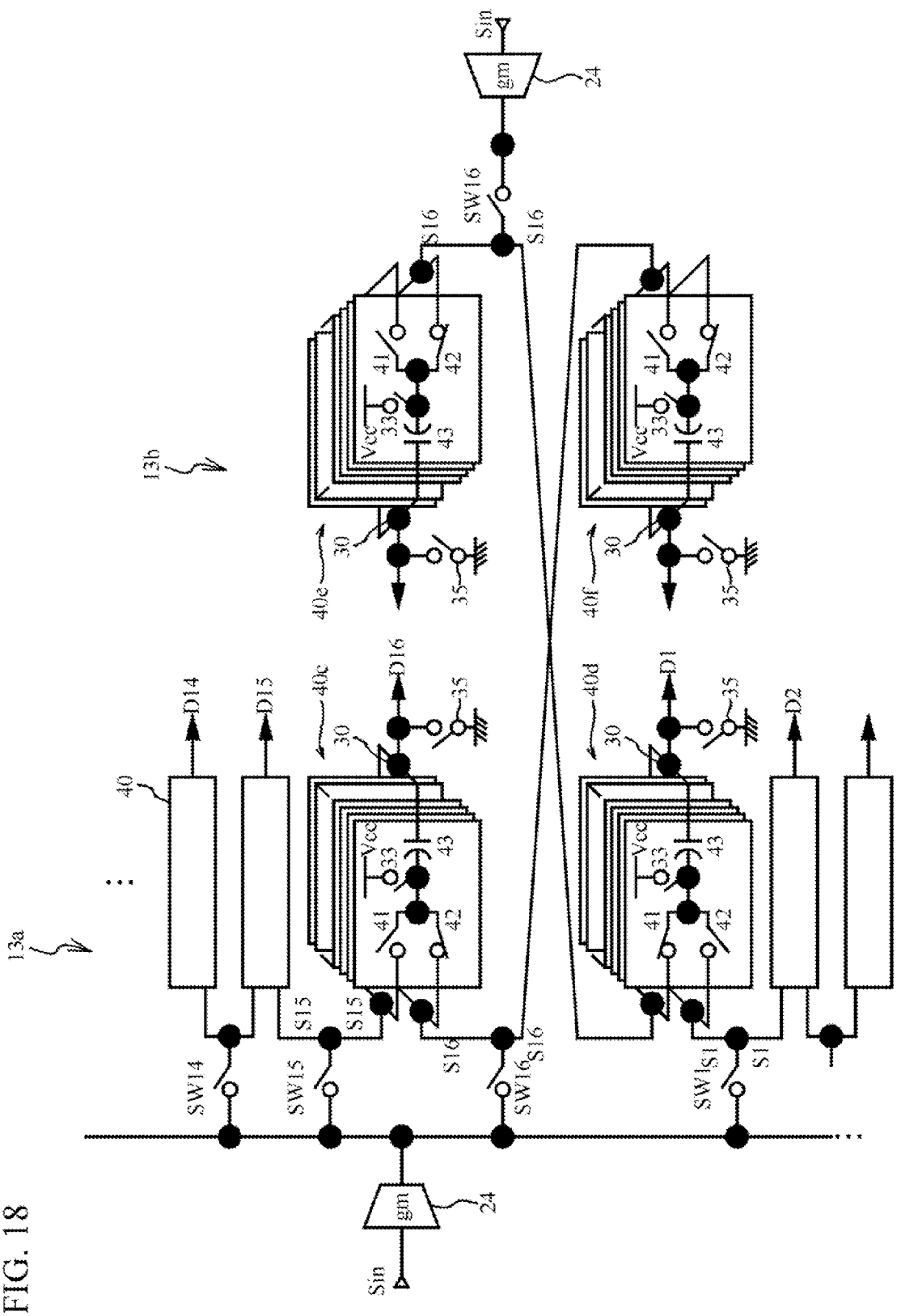
FIG. 18 is a circuit diagram of the interpolation circuit according to a variation 1 of the third embodiment.

FIG. 18 is a circuit diagram of the interpolation circuit according to a variation 1 of the third embodiment. As illustrated in FIG. 18, the circuit 13b does not includes circuits other than the capacitor circuits 40e and 40f, the switch 16, and the Gm circuit 24. Thus, the circuit 13b does not need to include circuit elements other than circuit elements used for the operation illustrated in FIGS. 14 to 16.

Figure 19:
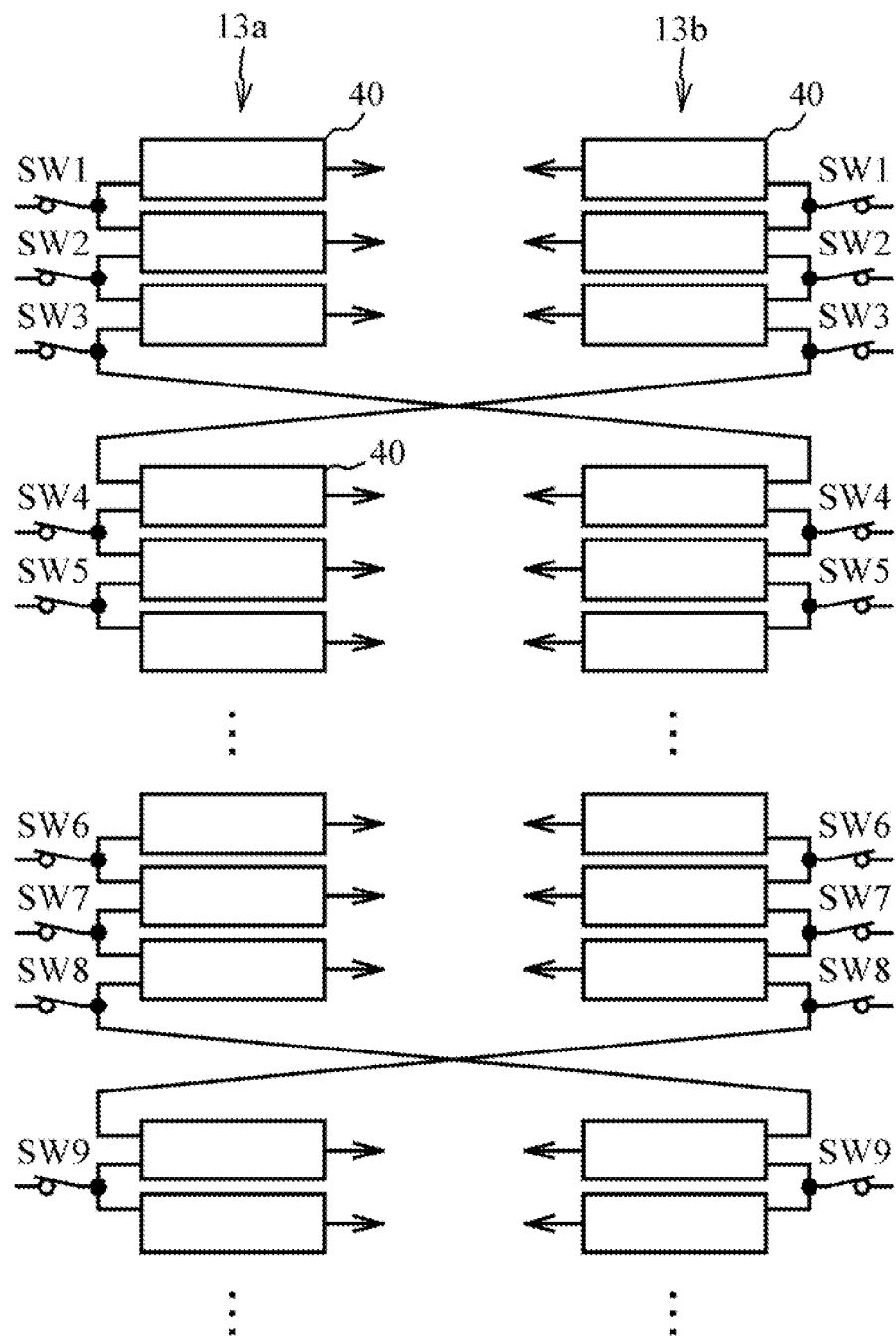
FIG. 19 is a circuit diagram of the interpolation circuit according to a variation 2 of the third embodiment.

FIG. 19 is a circuit diagram of the interpolation circuit according to a variation 2 of the third embodiment. Here, in FIG. 19, the Gm circuits 24 are omitted. As illustrated in FIG. 19, the circuits 13a and 13b may increase the location where the connection between the switch SWn of the circuit 13a and the capacitor circuit 40 of the circuit 13b, and the connection between the switch SWn of the circuit 13b and the capacitor circuit 40 of the circuit 13a intersect with each other. In the third embodiment, the circuit 13a includes sixteen capacitor circuits 40. This is to generate sampling timing of each of data S1 to Sn, generate the interpolation data, and secure time to charge the variable capacitors. If the interpolation coefficient is changed once per the sixteen capacitor circuits 40, timing for changing the interpolation coefficient is not increased. On the other hand, if the number of capacitor circuits 40 is reduced, time required for the sampling of each data cannot be secured sufficiently. Therefore, the control circuit 18 changes the interpolation coefficient at plural parts of the capacitor circuits 40. Thereby, the interpolation coefficient can be changed frequently. When a given period for changing the interpolation coefficient is long, and a difference between the frequency of the input data and the sampling frequency is large, the follow-up performance of the interpolation coefficient gets worse and it may be impossible to follow the generation of the interpolation data. According to the variation 2 of the third embodiment, the interpolation coefficient can be changed frequently, and hence more exact interpolation data can be obtained.

Also in the second embodiment, the control circuit 18 can change the interpolation coefficient at plural parts of the capacitor circuits 40. In the second and the third embodiments, the number of capacitor circuits 40 and the timing in which the control circuit 18 changes the interpolation coefficient can be set arbitrarily.

Figure 20:
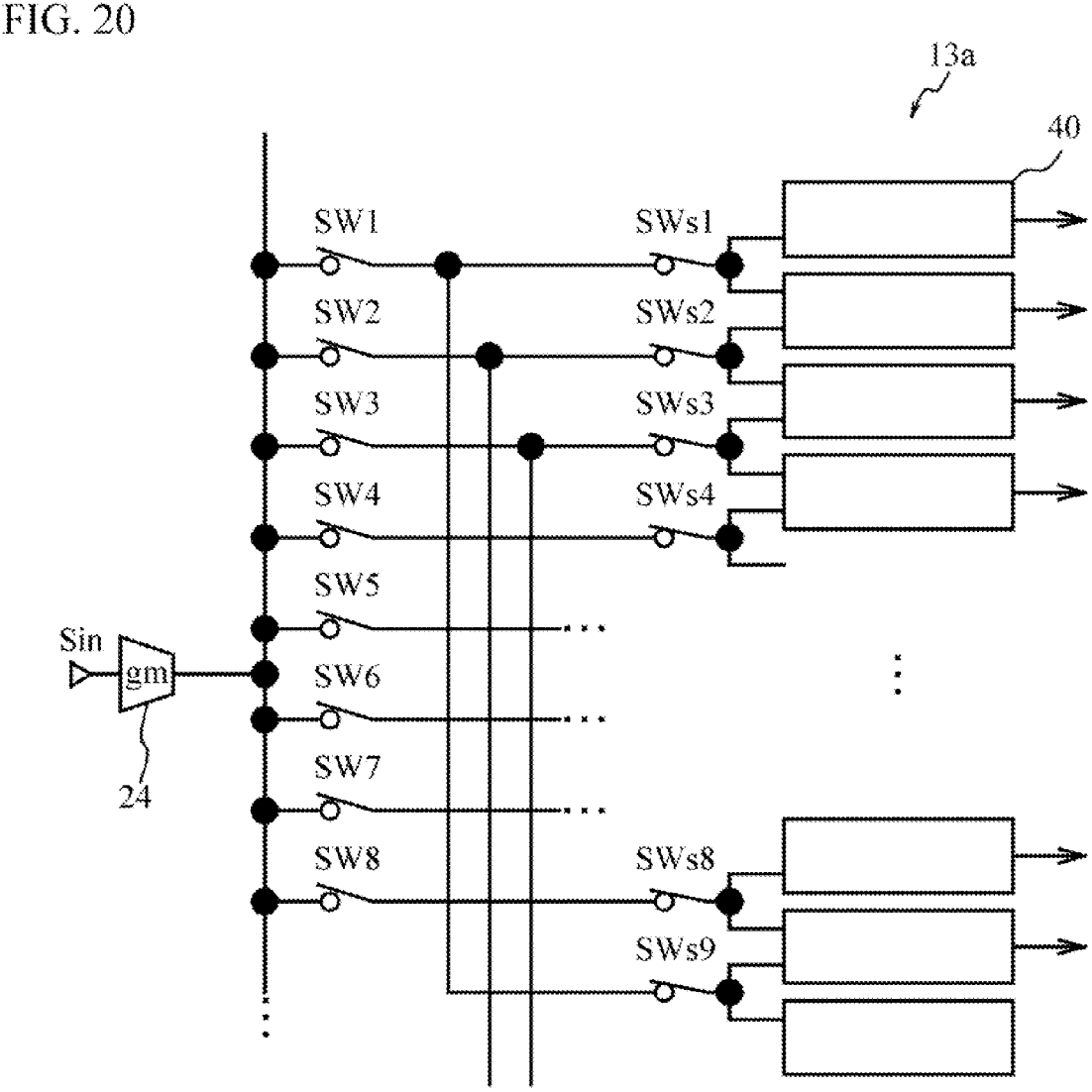
FIG. 20 is a block diagram of a circuit 13a according to a variation 3 of the third embodiment.
Figure 21:
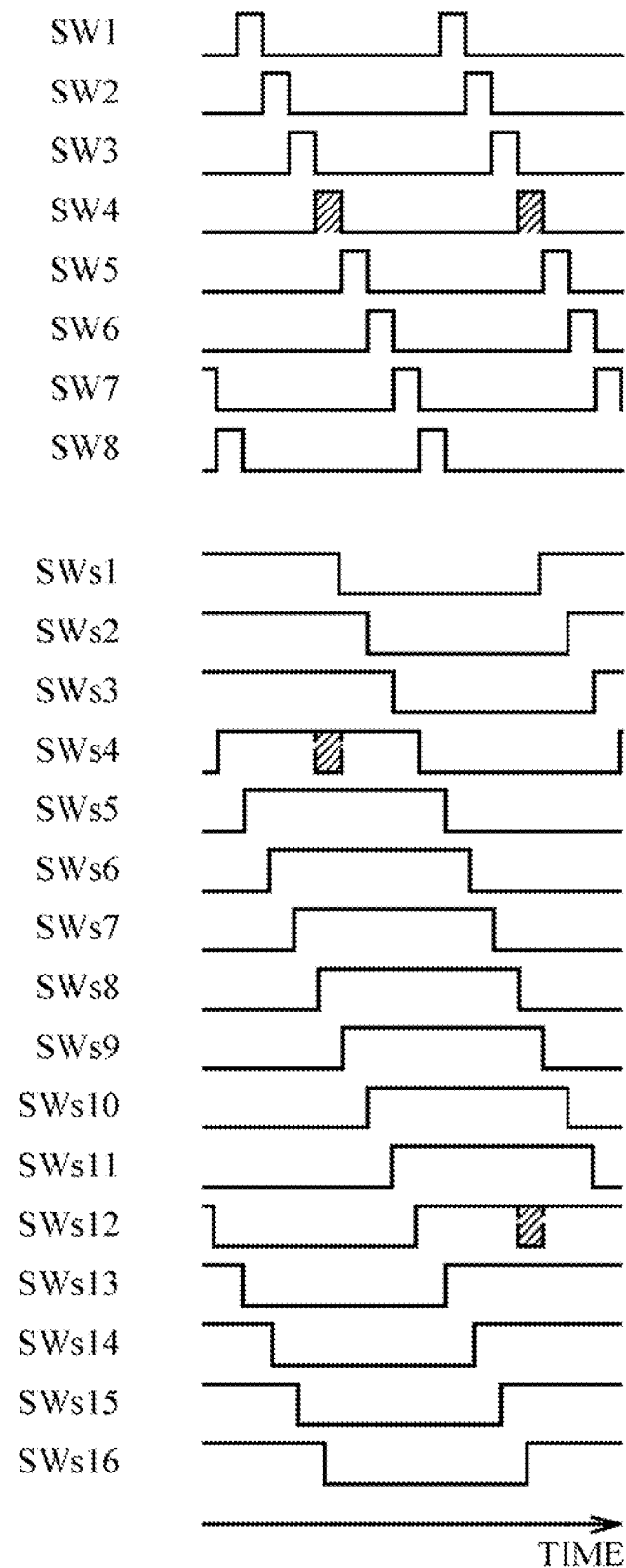
FIG. 21 is a timing chart of switches SWn and SWsn.

FIG. 20 is a block diagram of the circuit 13a according to a variation 3 of the third embodiment. As illustrated in FIG. 20, the switches SWn and the switches SWsn are connected in series. FIG. 21 is a timing chart of switches SWn and SWsn. A clock signal with short pulse widths is inputted to each of the switches SW1 to SW8. On the contrary, a clock signal with a long pulse width is inputted to each of the switches SWs1 to SWs16. When both of the switch SW4 and the switch SWs4 are turned on for example (see a hatching area of FIG. 21), the current is supplied from the switch SWs4 to the capacitor circuit 40. When both of the switch SW4 and the switch SWs12 are turned on (see a hatching area of FIG. 21), the current is supplied from the switch SWs12 to the capacitor circuit 40. The current from the Gm circuit 24 is supplied to the capacitor circuit 40 by AND (i.e., logical multiplication) of the clock signals. Thereby, the duty ratio of the clock signal corresponding to the switch SWn can be reduced. Therefore, generating the clock signal with a large duty ratio is unnecessary. In FIG. 20, the two switch SWn and SWsn are combined, but three or more switches may be combined. Moreover, the circuit 13a of FIG. 20 is applicable to the circuit 13a of the second embodiment.

Figure 22:
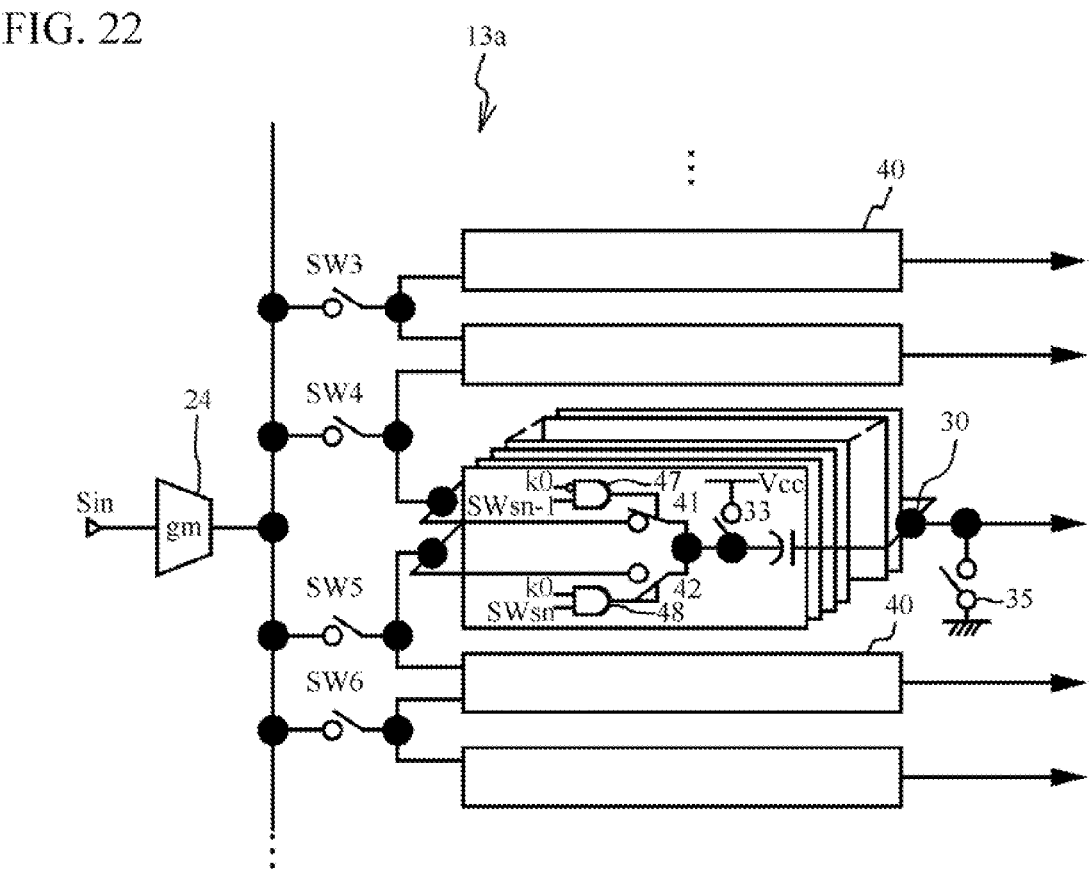
FIG. 22 is a circuit diagram of the circuit 13a according to a variation 4 of the third embodiment.

FIG. 22 is a circuit diagram of the circuit 13a according to a variation 4 of the third embodiment. As illustrated in FIG. 22, the capacitor circuit 40 includes AND circuits 47 and 48. A Complement signal of a signal K0 concerning the interpolation coefficient, and a clock signal SWsn−1 are inputted to the AND circuit 47. When the output of the AND circuit 47 is a high level, the switch 41 is turned on. When the output of the AND circuit 47 is a low level, the switch 41 is turned off. The signal K0 concerning the interpolation coefficient, and a clock signal SWsn are inputted to the AND circuit 48. When the output of the AND circuit 48 is a high level, the switch 42 is turned on. When the output of the AND circuit 48 is a low level, the switch 42 is turned off. The signal K0 concerning the interpolation coefficient is a signal that decides connecting the capacitor of the slice 45 to any one of the switches SW4 and SW5 according to the interpolation coefficient. In the case of such a circuitry, generating the clock signal with the large duty ratio is unnecessary like the variation 3. The circuit 13a of FIG. 22 is also applicable to the circuit 13a of the second embodiment.

According to the variation 3 and 4 of the third embodiment, the timing in which the current is applied to the first variable capacitor 36 and the second variable capacitor 38 of each capacitor circuit 40 is generated by AND (i.e., logical multiplication) of the clock signals. Thereby, generating the clock signal with the large duty ratio is unnecessary.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various change, substitutions, and alterations could be made hereto without departing from the spirit and scope of the invention.

What is claimed is:

1. An interpolation circuit comprising:
   a first circuit that generates first interpolation data from a plurality of pieces of data among data inputted in time series;
   a second circuit that generates second interpolation data from the plurality of pieces of data in timing when a part of the data inputted in time series in the first circuit lacks; and
   a third circuit that adds the second interpolation data to a location in the first interpolation data where the part of the data inputted in time series has lacked,
   a control circuit that changes an interpolation coefficient to be supplied to the first circuit for each given period,
   wherein the first circuit generates the first interpolation data using the interpolation coefficient, the second circuit generates the second interpolation data using an interpolation coefficient different from the interpolation coefficient of the first circuit, and the part of the data lacks in timing is when the interpolation coefficient is changed.

2. An interpolation circuit comprising:
   a first circuit that generates first interpolation data from a plurality of pieces of data among data inputted in time series;
   a second circuit that generates second interpolation data from the plurality of pieces of data in timing when a part of the data inputted in time series in the first circuit lacks; and
   a third circuit that adds the second interpolation data to a location in the first interpolation data where the part of the data inputted in time series has lacked,
   a control circuit that changes an interpolation coefficient to be supplied to the first circuit for each given period,
   wherein:
   the first circuit generates the first interpolation data using the interpolation coefficient, the second circuit generates the second interpolation data using an interpolation coefficient different from the interpolation coefficient of the first circuit,
   the first circuit includes a first capacitor circuit that generates the first interpolation data,
   the second circuit includes a second capacitor circuit that generates the second interpolation data,
   each of the first and the second capacitor circuits includes a first variable capacitor and a second variable capacitor that are capable of changing capacitance values according to the interpolation coefficient, and the first interpolation data and the second interpolation data are formed by applying currents corresponding to the plurality of pieces of data to the first and the second variable capacitors in timing when the first variable capacitor is earlier than the second variable capacitor, and synthesizing electric charges of the first and the second variable capacitors.

3. The interpolation circuit as claimed in claim 2, wherein the first circuit includes a plurality of first capacitor circuits corresponding to the plurality of pieces of data within the given period, and a current is applied at the same time to the second variable capacitor of one first capacitor circuit among two first capacitor circuits corresponding to adjacent data inputted in time series, and the first variable capacitor of another first capacitor circuit among the two first capacitor circuits, the one first capacitor circuit corresponding to early data in the adjacent data inputted in time series.

4. The interpolation circuit as claimed in claim 3, wherein the second circuit includes a plurality of second capacitor circuits corresponding to at least part of the plurality of pieces of data within the given period, a current is applied at the same time to the second variable capacitor of one second capacitor circuit among two second capacitor circuits corresponding to adjacent data inputted in time series, and the first variable capacitor of another second capacitor circuit among the two second capacitor circuits, the one second capacitor circuit corresponding to early data in the adjacent data inputted in time series, and the control circuit changes the interpolation coefficient to be supplied to the second circuit in timing different from change timing of the interpolation coefficient to be supplied to the first circuit.

5. The interpolation circuit as claimed in claim 3, wherein the control circuit changes the interpolation coefficient at a plurality of locations in the first capacitor circuits and the second capacitor circuits.

6. The interpolation circuit as claimed in claim 3, wherein applied timing of the current is generated by AND operation of a plurality of clock signals.

7. The interpolation circuit as claimed in claim 2, wherein the first circuit and the second circuit includes a plurality of third capacitor circuits corresponding to the plurality of pieces of data within the given period, and two fourth capacitor circuits corresponding to data in which the interpolation coefficient to be supplied to the first circuit is changed, each of the third and the fourth capacitor circuits includes a first variable capacitor and a second variable capacitor that are capable of changing capacitance values according to the interpolation coefficient, a current is applied at the same time to the second variable capacitor of one third capacitor circuit among two third capacitor circuits corresponding to the data in which the interpolation coefficient is changed, and the first variable capacitor of one fourth capacitor circuit among the two fourth capacitor circuits, the one third capacitor circuit corresponding to early data inputted in time series and the one fourth capacitor circuit corresponding to late data inputted in time series, and a current is applied at the same time to the first variable capacitor of another third capacitor circuit among the two third capacitor circuits, and the second variable capacitor of another fourth capacitor circuit among the two fourth capacitor circuits.

8. The interpolation circuit as claimed in claim 7, wherein the control circuit supplies the interpolation coefficient after changing to the one third capacitor circuit among the two third capacitor circuits, and supplies the interpolation coefficient before changing to the another third capacitor circuit among the two third capacitor circuits.

9. The interpolation circuit as claimed in claim 7, wherein in third capacitor circuits other than the two third capacitor circuits among the plurality of third capacitor circuits, a current is applied at the same time to the second variable capacitor of one third capacitor circuit among two adjacent third capacitor circuits corresponding to adjacent data inputted in time series, and the first variable capacitor of another third capacitor circuit among the two adjacent third capacitor circuits, the one third capacitor circuit corresponding to early data in the adjacent data inputted in time series.

10. The interpolation circuit as claimed in claim 7, wherein the control circuit changes the interpolation coefficient at a plurality of locations in the third capacitor circuits.

11. The interpolation circuit as claimed in claim 2, wherein the capacitance values of the first and the second variable capacitors are changed so that the sum of the capacitance values of the first and the second variable capacitors becomes constant.

12. A receiving circuit, comprising:
an interpolation circuit including:
a first circuit that generates first interpolation data from a plurality of pieces of data among data inputted in time series;
a second circuit that generates second interpolation data from the plurality of pieces of data in timing when a part of the data inputted in time series in the first circuit lacks; and
a third circuit that adds the second interpolation data to a location in the first interpolation data where the part of the data inputted in time series has lacked;
a control circuit that changes an interpolation coefficient to be supplied to the first circuit for each given period; and
a calculation circuit that calculates an interpolation coefficient based on an output of the third circuit,
wherein the first circuit generates the first interpolation data using the interpolation coefficient, the second circuit generates the second interpolation data using an interpolation coefficient different from the interpolation coefficient of the first circuit, and the part of the data lacks in timing is when the interpolation coefficient is changed.

13. A receiving circuit, comprising:
an interpolation circuit including:
a first circuit that generates first interpolation data from a plurality of pieces of data among data inputted in time series;
a second circuit that generates second interpolation data from the plurality of pieces of data in timing when a part of the data inputted in time series in the first circuit lacks; and
a third circuit that adds the second interpolation data to a location in the first interpolation data where the part of the data inputted in time series has lacked;
a control circuit that changes an interpolation coefficient to be supplied to the first circuit for each given period; and
a calculation circuit that calculates an interpolation coefficient based on an output of the third circuit, wherein:
the first circuit generates the first interpolation data using the interpolation coefficient, the second circuit generates the second interpolation data using an interpolation coefficient different from the interpolation coefficient of the first circuit,
the first circuit includes a first capacitor circuit that generates the first interpolation data,
the second circuit includes a second capacitor circuit that generates the second interpolation data,
each of the first and the second capacitor circuits includes a first variable capacitor and a second variable capacitor that are capable of changing capacitance values according to the interpolation coefficient, and
the first interpolation data and the second interpolation data are formed by applying currents corresponding to the plurality of pieces of data to the first and the second variable capacitors in timing when the first variable capacitor is earlier than the second variable capacitor, and synthesizing electric charges of the first and the second variable capacitors.

* * * * *